(12) United States Patent
Abe et al.

(10) Patent No.: US 8,347,224 B2
(45) Date of Patent: Jan. 1, 2013

(54) CONTENT VIEWING METHOD, CONTENT VIEWING APPARATUS, AND STORAGE MEDIUM IN WHICH A CONTENT VIEWING PROGRAM IS STORED

(75) Inventors: Yuichi Abe, Tokyo (JP); Yoichiro Sako, Tokyo (JP); Itaru Kawakami, Kanagawa (JP); Mitsuru Takehara, Tokyo (JP); Takatoshi Nakamura, Ibaraki (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 11/986,133

(22) Filed: Nov. 20, 2007

(65) Prior Publication Data

US 2008/0126979 A1     May 29, 2008

(30) Foreign Application Priority Data

Nov. 29, 2006  (JP) ................. 2006-321045

(51) Int. Cl.
  *G06F 3/048* (2006.01)
(52) U.S. Cl. .................. 715/781; 715/835; 707/737
(58) Field of Classification Search .............. 715/781, 715/853, 961; 707/737
See application file for complete search history.

(56) References Cited

U.S. PATENT DOCUMENTS

| | | | |
|---|---|---|---|
| 5,481,666 A * | 1/1996 | Nguyen et al. .......... 715/854 |
| 5,537,618 A * | 7/1996 | Boulton et al. .......... 715/745 |
| 5,576,759 A | 11/1996 | Kawamura et al. | |
| 5,898,431 A * | 4/1999 | Webster et al. .......... 715/841 |
| 6,340,978 B1 * | 1/2002 | Mindrum .............. 715/764 |
| 6,661,438 B1 * | 12/2003 | Shiraishi et al. .......... 715/835 |
| 6,868,189 B1 | 3/2005 | Hoshino | |
| 6,996,782 B2 * | 2/2006 | Parker et al. .......... 715/764 |
| 7,281,199 B1 * | 10/2007 | Nicol et al. .......... 715/203 |
| 7,356,202 B2 | 4/2008 | Hoshino | |
| 7,506,979 B2 | 3/2009 | Yamaguchi | |

(Continued)

FOREIGN PATENT DOCUMENTS

CN     1252573 A     5/2000

(Continued)

OTHER PUBLICATIONS

Vetro et al., "Media Conversions to Support Mobile Users", Electrical and Computer Engineering, 2001. Canadian Conference on May 13-16, 2001, pp. 607-612, vol. 1, Piscataway, New Jersey, USA.

(Continued)

*Primary Examiner* — Phenuel Salomon
(74) *Attorney, Agent, or Firm* — Wolf, Greenfield & Sacks, P.C.

(57) ABSTRACT

In a content viewing apparatus, an acquisition unit acquires a content set including one or more contents, and a conversion unit converts each content in the content set acquired by the acquisition unit into a predetermined format. An arrangement unit arranges indication information of each content subjected to the conversion performed by the conversion unit such that the indication information of each content is displayed on a display device in such a manner that indication information of each content is arranged along a time axis according to date/time information associated with each content thereby making it possible to use each content via the corresponding indication information. In accordance with an operation command input by a user, a display control unit controls displaying of the indication information of all contents as a whole, displayed on the display device by the arrangement unit, along the time axis.

20 Claims, 12 Drawing Sheets

U.S. PATENT DOCUMENTS

| | | | |
|---|---|---|---|
| 7,509,321 B2* | 3/2009 | Wong et al. | 1/1 |
| 7,590,308 B2 | 9/2009 | Hoshino | |
| 7,873,919 B2 | 1/2011 | Nakamura et al. | |
| 7,895,180 B2 | 2/2011 | Abe et al. | |
| 2001/0046330 A1* | 11/2001 | Shaffer et al. | 382/284 |
| 2002/0075322 A1* | 6/2002 | Rosenzweig et al. | 345/835 |
| 2002/0135621 A1* | 9/2002 | Angiulo et al. | 345/838 |
| 2002/0140820 A1* | 10/2002 | Borden, IV | 348/207.99 |
| 2002/0167538 A1* | 11/2002 | Bhetanabhotla | 345/700 |
| 2003/0033296 A1* | 2/2003 | Rothmuller et al. | 707/3 |
| 2003/0084065 A1* | 5/2003 | Lin et al. | 707/104.1 |
| 2004/0205479 A1* | 10/2004 | Seaman et al. | 715/500.1 |
| 2005/0000826 A1 | 1/2005 | Qiao | |
| 2005/0008264 A1* | 1/2005 | Iida et al. | 382/305 |
| 2005/0071783 A1* | 3/2005 | Atkins | 715/851 |
| 2005/0076056 A1* | 4/2005 | Paalasmaa et al. | 707/104.1 |
| 2005/0091596 A1* | 4/2005 | Anthony et al. | 715/712 |
| 2005/0094031 A1 | 5/2005 | Tecot et al. | |
| 2005/0105374 A1* | 5/2005 | Finke-Anlauff et al. | 365/232 |
| 2005/0108643 A1* | 5/2005 | Schybergson et al. | 715/713 |
| 2005/0114793 A1 | 5/2005 | Jung | |
| 2005/0117811 A1 | 6/2005 | Hoshino | |
| 2005/0163221 A1 | 7/2005 | Oka et al. | |
| 2005/0187943 A1* | 8/2005 | Finke-Anlauff et al. | 707/100 |
| 2005/0210145 A1 | 9/2005 | Kim et al. | |
| 2006/0059165 A1 | 3/2006 | Bosloy et al. | |
| 2006/0064716 A1 | 3/2006 | Sull et al. | |
| 2006/0155757 A1* | 7/2006 | Williams et al. | 707/103 R |
| 2006/0184573 A1 | 8/2006 | Koori | |
| 2006/0264733 A1 | 11/2006 | Masaki | |
| 2007/0174302 A1 | 7/2007 | Ishiguro et al. | |
| 2007/0186189 A1 | 8/2007 | Schiller | |
| 2007/0189720 A1 | 8/2007 | Nakamura et al. | |
| 2007/0245267 A1 | 10/2007 | Nakamura et al. | |
| 2008/0177723 A1 | 7/2008 | Abe et al. | |
| 2008/0219595 A1 | 9/2008 | Hoshino | |
| 2009/0285501 A1 | 11/2009 | Hoshino | |

FOREIGN PATENT DOCUMENTS

| | | |
|---|---|---|
| CN | 1804838 A | 7/2006 |
| JP | 06-180661 A | 6/1994 |
| JP | 2000-132601 A | 5/2000 |
| JP | 2002-158948 A | 5/2002 |
| JP | 2002-334257 A | 11/2002 |
| JP | 2003-076598 A | 3/2003 |
| JP | 2003-345826 A | 12/2003 |
| JP | 2004-030145 A | 1/2004 |
| JP | 2004-328265 A | 11/2004 |
| JP | 2004-348620 A | 12/2004 |
| JP | 2004-355493 A | 12/2004 |
| JP | 2004-356774 A | 12/2004 |
| JP | 2005-045510 A | 2/2005 |
| JP | 2005-159770 A | 6/2005 |
| JP | 2005-176134 A | 6/2005 |
| JP | 2005-284574 A | 10/2005 |
| JP | 2005-293313 A | 10/2005 |
| JP | 2005-327121 A | 11/2005 |
| JP | 2005-353072 A | 12/2005 |
| JP | 2006-092210 A | 4/2006 |
| JP | 2006-244051 A | 9/2006 |
| JP | 2006-251953 A | 9/2006 |
| JP | 2006-277441 A | 10/2006 |
| JP | 2006-301995 A | 11/2006 |
| WO | WO 2005/076156 A1 | 8/2005 |

OTHER PUBLICATIONS

Shardanand et al., "Social Information Filtering: Algorithms for Automating" Word of Mouth, ACM CHI '95 Proceedings, 1995 http://acm.org/sigchi/chi95/electronic/documents/papers/us_bdy.htm.

Lee et al., Image indexing and similarity retrieval based on key objects. IEEE International Conference on Multimedia and Expo. 2004:819-22.

Li et al., Techniques for associative retrieval. Air Force Research Laboratory, Stanford University. Mar. 2001. 34 pages.

* cited by examiner

FIG. 5
A: BEFORE DELETED
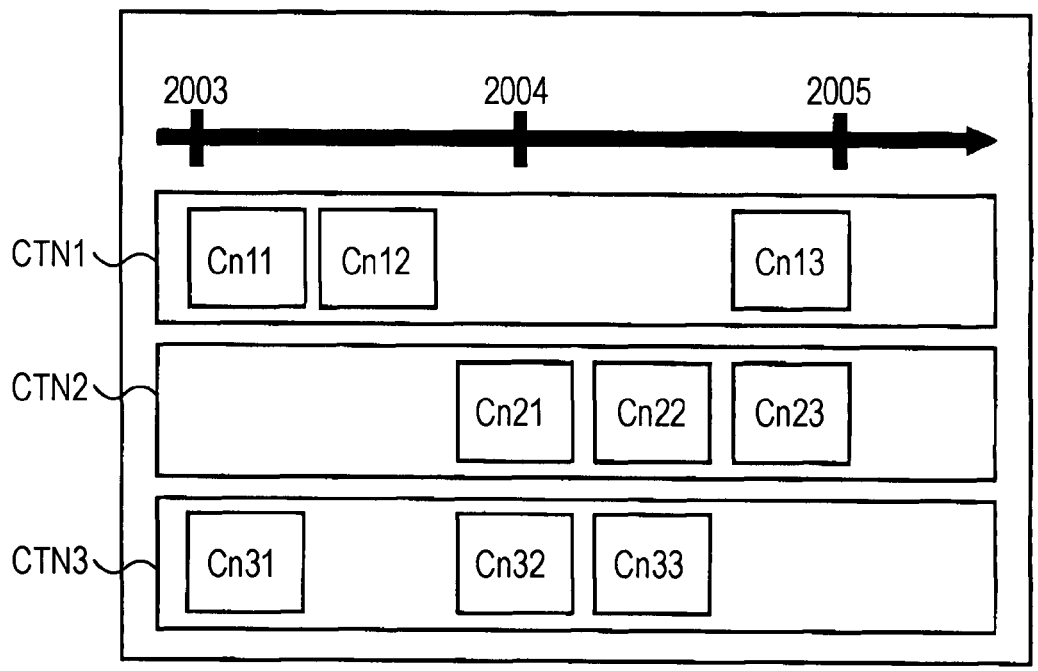
DELETING OF SECOND ROW
B: AFTER DELETED
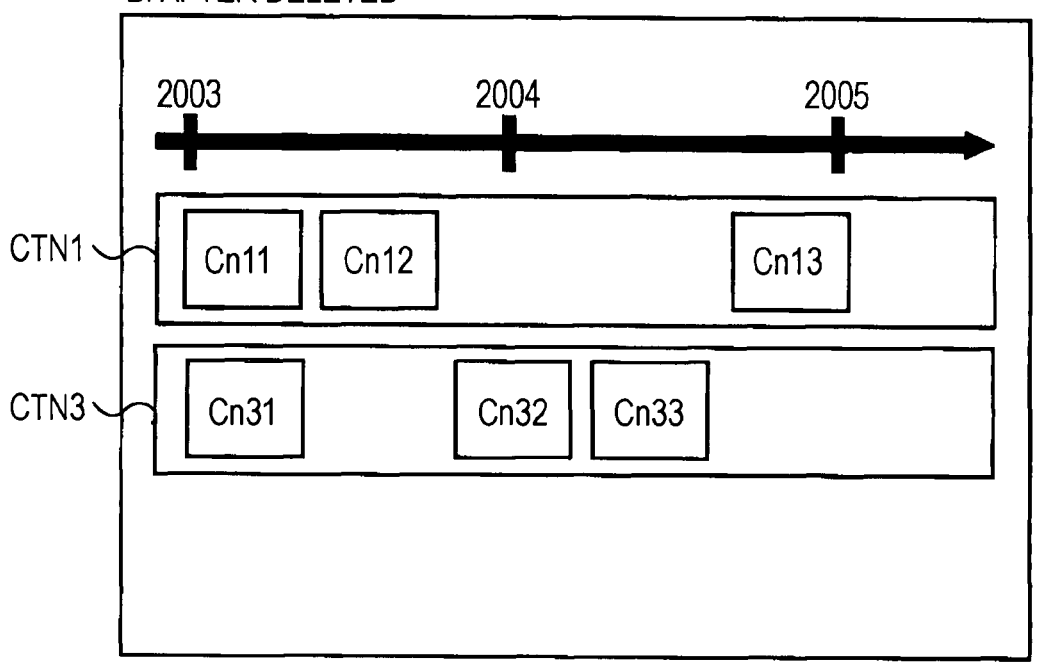

FIG. 6
A: BEFORE EXCHANGED
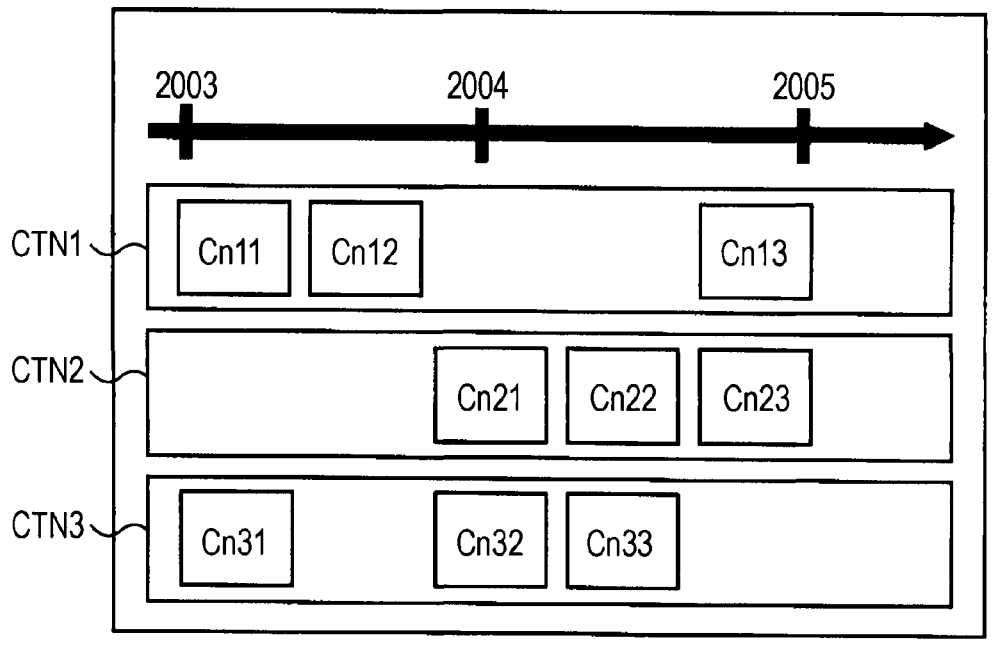
↓ EXCHANGING BETWEEN SECOND AND THIRD ROWS
B: AFTER EXCHANGED
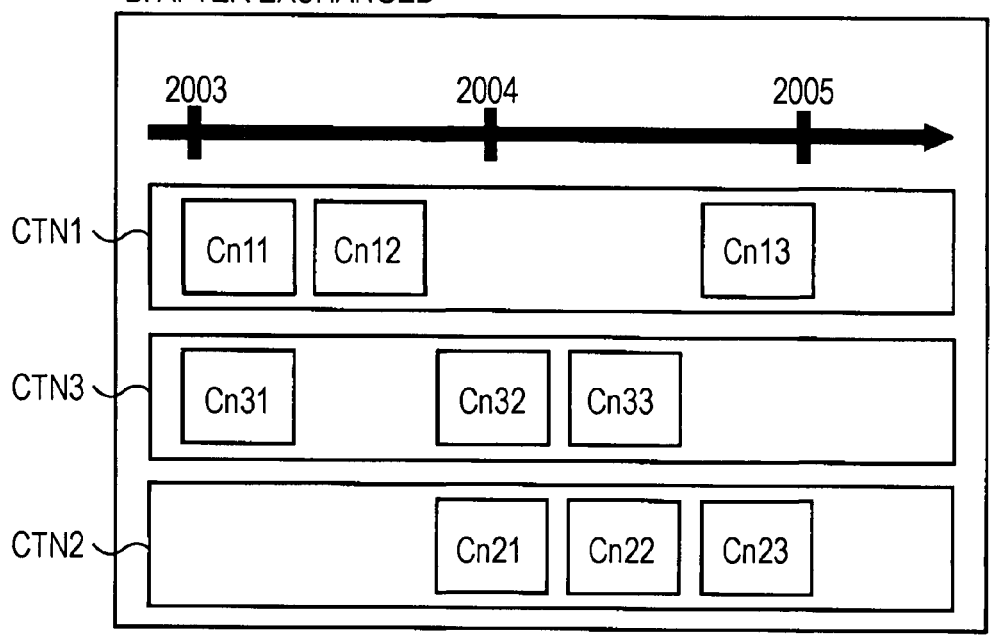

FIG. 7
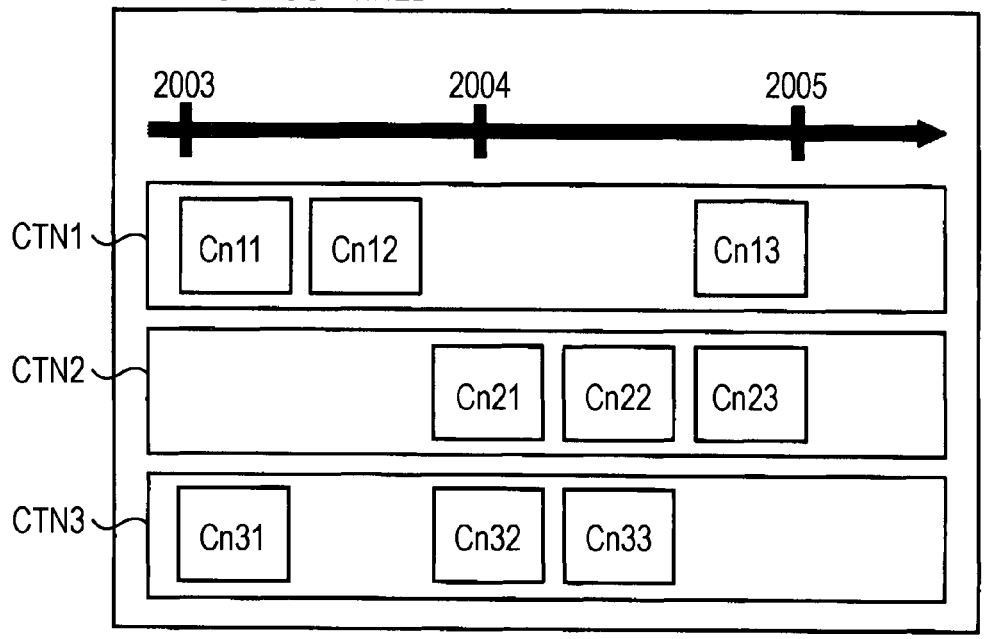
A: BEFORE COMBINED
COMBINING OF SECOND AND THIRD ROWS
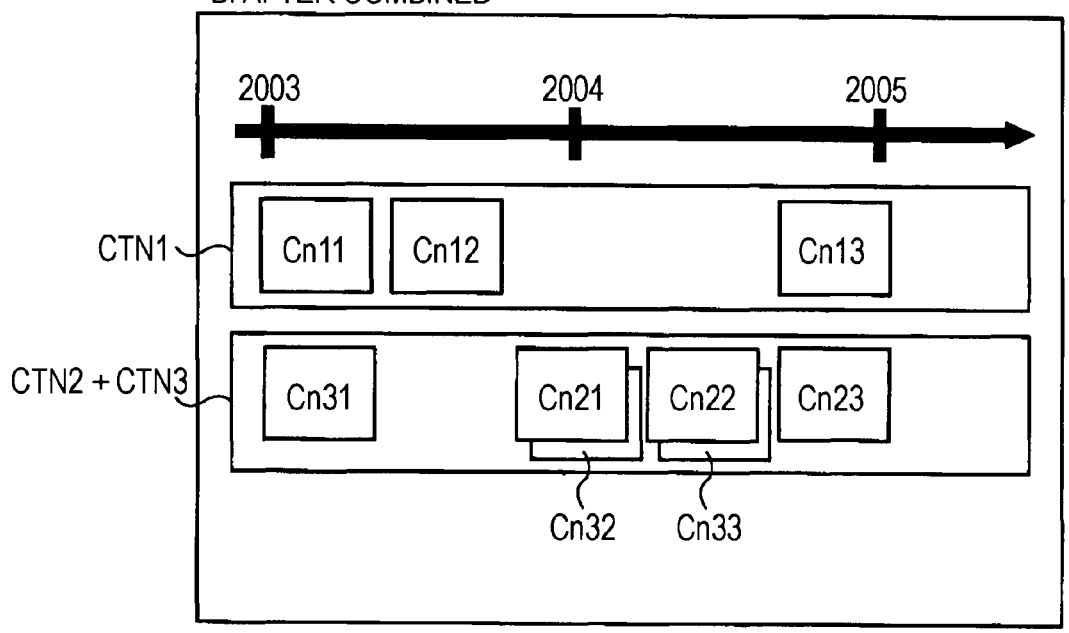
B: AFTER COMBINED FIG. 8
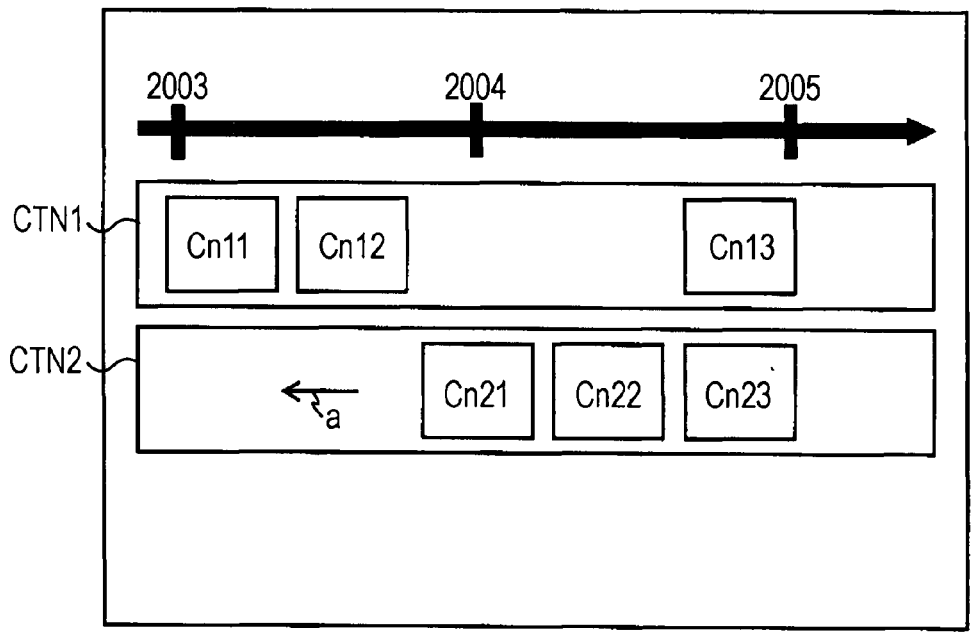
A: BEFORE MOVED
MOVEMENT OF CONTENT IN SECOND ROW WITHIN CONTAINER
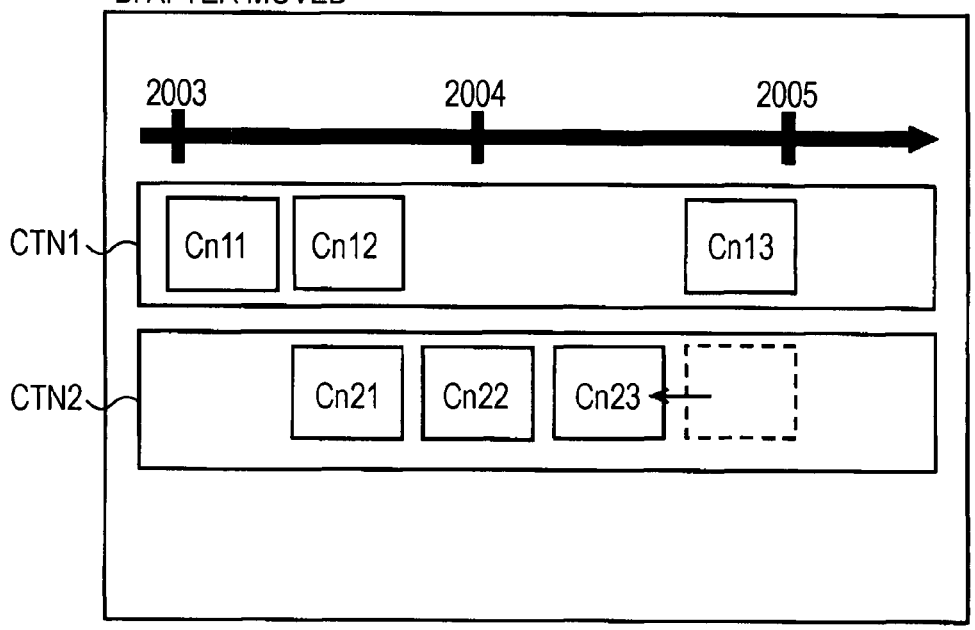
B: AFTER MOVED

FIG. 10
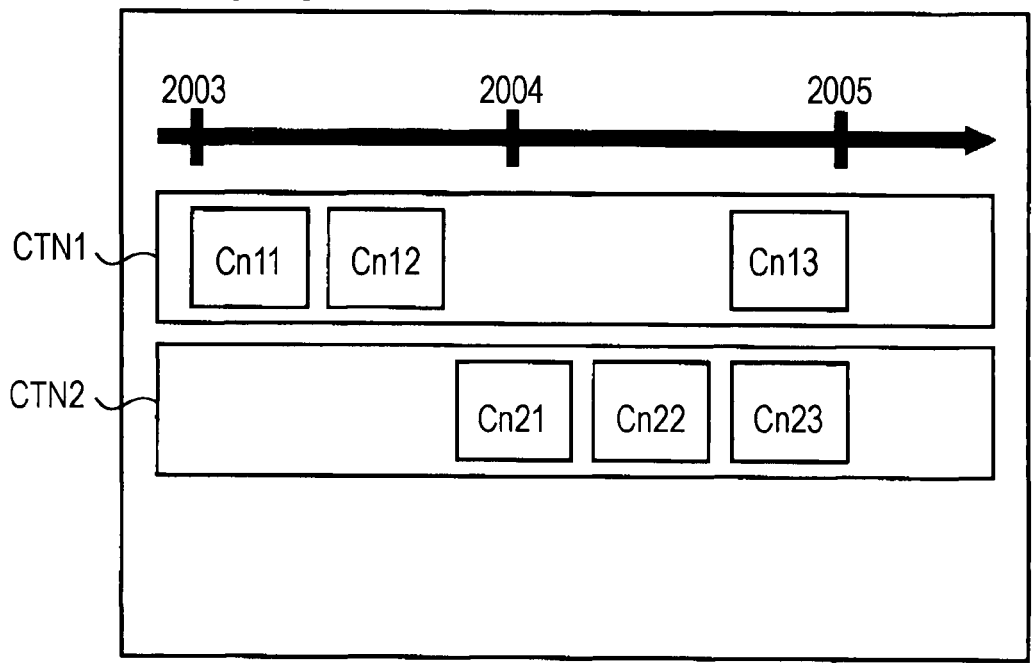
A: BEFORE UPDATED
AUTOMATIC UPDATING OF CONTENT IN SECOND ROW
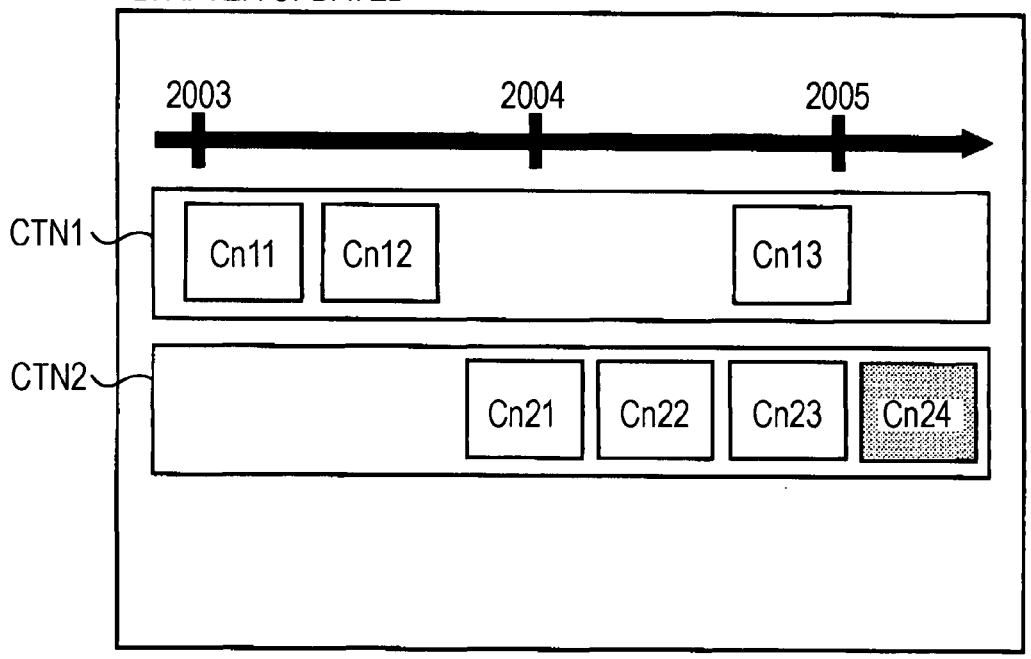
B: AFTER UPDATED

CONTENT VIEWING METHOD, CONTENT VIEWING APPARATUS, AND STORAGE MEDIUM IN WHICH A CONTENT VIEWING PROGRAM IS STORED

CROSS REFERENCES TO RELATED APPLICATIONS

The present invention contains subject matter related to Japanese Patent Application JP 2006-321045 filed in the Japanese Patent Office on Nov. 29, 2006, the entire contents of which are incorporated herein by reference.

BACKGROUND OF THE INVENTION

1. Field of the Invention

The present invention relates to a method, an apparatus, and a program storage medium, for efficiently browsing and viewing a wide variety of contents available on a wide area network such as the Internet or a wide variety of contents stored in a local storage.

2. Description of the Related Art

With a recent increase in popularity of the Internet and with a recent increase in popularity of personal computers and portable information processing terminals having a communication capability, it has become popular to acquire various kinds of information via Web pages provided by servers on the Internet. Note that Web is a short form of World Wide Web and is also expressed as WWW.

Web pages are units of Web contents. When a Web content is viewed via viewing software such as a browser or a viewer, one Web page is displayed at a time. Each Web page may include various kinds of digital information (content data) such as text information, still image information, motion image information, audio information, graphics information, or a program or a combination of two or more such information. More specifically, each Web page may include digital data of a photographic image (still image information), a movie (motion image information), diary information called a blog, comment information, book review information, schedule information, mail information, etc.

As described above, viewing software such as a browser or a viewer is used to view a Web page (digital content) provided by a server on the Internet. More specifically, use of viewing software makes it possible to acquire a desired Web page from a server on the Internet. Display information such as text information, still image information, motion image information, etc. included in the acquired Web page is displayed on a display screen, while audio information such as music information included in the Web page is reproduced in the form of a voice/sound.

Many techniques have been proposed to improve easiness or convenience in using viewing software. For example, in viewing software disclosed in Japanese Unexamined Patent Application Publication No. 2004-030145, book mark data indicating an address of a site is displayed in the form of a thumbnail image so that a user is allowed to easily select a desired site.

In viewing software disclosed in Japanese Unexamined Patent Application Publication No. 2003-076598, when a content has been updated, information indicating that the content has been updated is provided to a user without the user needing to perform any operation, so that the user does not miss updated information.

SUMMARY OF THE INVENTION

As described above, one Web page is displayed at a time on the viewing software. In other words, a user is allowed to view a single Web page at a time on the viewing software. When a current Web page being displayed on the viewing software is linked to another Web page, it is easy to jump to the linked Web page. Also in the linked Web page, information is displayed on a page-by-page basis.

In recent years, great advances in technology of storage devices (storage media) such as a hard disk or a semiconductor memory have been made, and an increase in storage capacity, a reduction in cost, and a reduction in physical size have been achieved. As a result, many personal computers and portable information terminals usually include a high-capacity storage medium (local storage). Digital still cameras and digital video cameras have also become very popular, and a wide variety of digital music contents are now easily available. Thus, various kinds of digital data such as text data, still image data, motion image data, audio data, graphics data, programs, or a combination of such data are stored in personal computers or local storages of portable information terminals or the like.

It is known to use a search program to quickly find a content from a large number of various contents stored in a local storage. For example, an image search program is available, which searches for images over a large number of folders and displays found images in the form of a list so that a user can quickly use desired images.

Nowadays, a large number of digital contents are available via wide area networks such as the Internet and the number of such digital contents is still increasing. Nowadays, a large number of digital contents are stored in local storages of personal computers or portable information terminals and are used by many users. The number of such digital contents is also still increasing.

As described above, the viewing program allows a user to view one Web page at a time, and the image search program is designed to search for only image data stored in a local storage. Thus, a wide variety of digital contents located in various online storages or in various folders of various local storages are allowed to be used in predetermined units, separately depending on the data source, the data type, the data folder, and so on. That is, it is not allowed to simultaneously use a mixture of Web pages and digital contents stored in the local storage.

Thus, there is a need for a technique to efficiently selecting a digital content from a large number of various kinds of digital contents regardless of whether digital contents are stored in network storages or local storages and regardless of types of digital contents.

In view of the above, it is desirable to provide a technique to very efficiently use various digital contents stored in network storages or local storages.

According to an embodiment of the present invention, there is provided a content viewing method including acquiring a content set including one or more contents, converting each content in the content set acquired in the acquisition steps into a predetermined format, arranging indication information of each content subjected to the conversion in the conversion step such that the indication information of each content is displayed on a display device in such a manner that indication information of each content is arranged along a time axis according to date/time information associated with each content thereby making it possible to use each content via the corresponding indication information, and in accordance with an operation command input by a user, controlling displaying of the indication information of all contents as a whole, displayed in the arrangement step on the display device, along the time axis.

In this content viewing method, a content set is acquired in the acquisition step, and each content in the acquired content set is converted, in the conversion step, into the predetermined format. The conversion step may include converting a content into a format which can be handled, extracting date/time information, assigning date/time information if a content includes no date/time information, extracting indication information in the form of an icon, thumbnail image or the like via which to use a content, and producing indication information if a content includes no indication information.

In the arrangement step, indication information of each content is displayed on the display device in a state in which indication information of each content is arranged along the time axis in accordance with date/time information of each content of the content set. In the display control step, the indication information displayed on the display device is controlled as a whole.

Thus, it becomes possible to refer to contents of content sets with reference to the time axis. The capability of controlling displaying of indication information as a whole according to the time axis makes it possible to use contents in a very efficient manner.

In this content viewing method, in the arrangement step, if content indication information of a content set is already displayed, indication information of contents of a new content set specified to be displayed may be arranged in a line parallel to a line in which the already displayed content indication information lies, without changing the time axis, and in the display control step, the indication information of all contents of the new content set may be displayed in parallel to the already displayed indication information.

In this mode of the content viewing method, in the arrangement step, indication information of each content of each content set is displayed such that content sets are parallel to each other without changing the time axis. In the display control step, the indication information of all contents of the new content set may be displayed in parallel to the already displayed indication information.

This makes it possible to easily view and compare contents of a plurality of content set displayed in parallel along the same axis, and thus it becomes possible to use various kinds of contents in a very efficient manner.

In the present content viewing method, the display control step may include scrolling the indication information in a direction along the time axis or enlarging or reducing the indication information along the time axis in accordance with an operation command input by a user.

In this mode of the content viewing method, in the display control step, the indication information of contents may be scrolled in a direction along the time axis, or the indication information of contents may be enlarged or reduced along the time axis, as required.

The scrolling makes it possible to easily display indication information of a desired content. Enlarging or reducing of the indication information along the time axis makes it possible to change the mode of displaying the indication information of contents whereby it becomes possible to easily make a comparison among contents and easily understand correspondence among contents. Thus, it becomes possible to easily use various kinds of contents in a very efficient manner.

In the present content viewing method, the display control step may include one or more of the following substeps as required, deleting a content set, exchanging content sets, combining content sets, moving a content set in terms of time, expanding a content set in terms of time, reducing content set in terms of time, and automatically updating a content.

In this mode of the content viewing method, in the display control step, deleting a content set, exchanging content sets displayed at different locations, combining content sets, moving a content set to a different location in terms of time, expanding a content set in terms of time, reducing content set in terms of time, and/or automatically updating indication information when a new content is added to a content set are performed as required.

This makes it possible to display contents of a content set of interest in a desired displaying mode so that it becomes possible to easily make a comparison among contents of content sets displayed in parallel. Thus, it becomes possible to easily use various kinds of contents in a very efficient manner.

As described above, the present invention provides a great advantage that a large number of contents stored at various different locations such as sites on a network or local storages can be displayed in the innovative manner according to time information.

The present invention also provides a great advantage that contents of a plurality of content sets are displayed along the same time axis but in parallel different lines depending on the content sets, whereby it becomes possible to easily make a comparison among content sets.

BRIEF DESCRIPTION OF THE DRAWINGS

FIG. 5 is a diagram for explanation of deleting a container;

FIG. 6 is a diagram for explanation of exchanging containers in terms of locations;

FIG. 7 is a diagram for explanation of combining containers;

FIG. 8 is a diagram for explanation of moving of a container along a time axis;

FIG. 10 is a diagram for explanation of automatic updating of a container;

DESCRIPTION OF THE PREFERRED EMBODIMENTS

The present invention is described in further detail below with reference to embodiments in conjunction with the accompanying drawings.

Configuration of Content Viewing Apparatus

Figure 1:
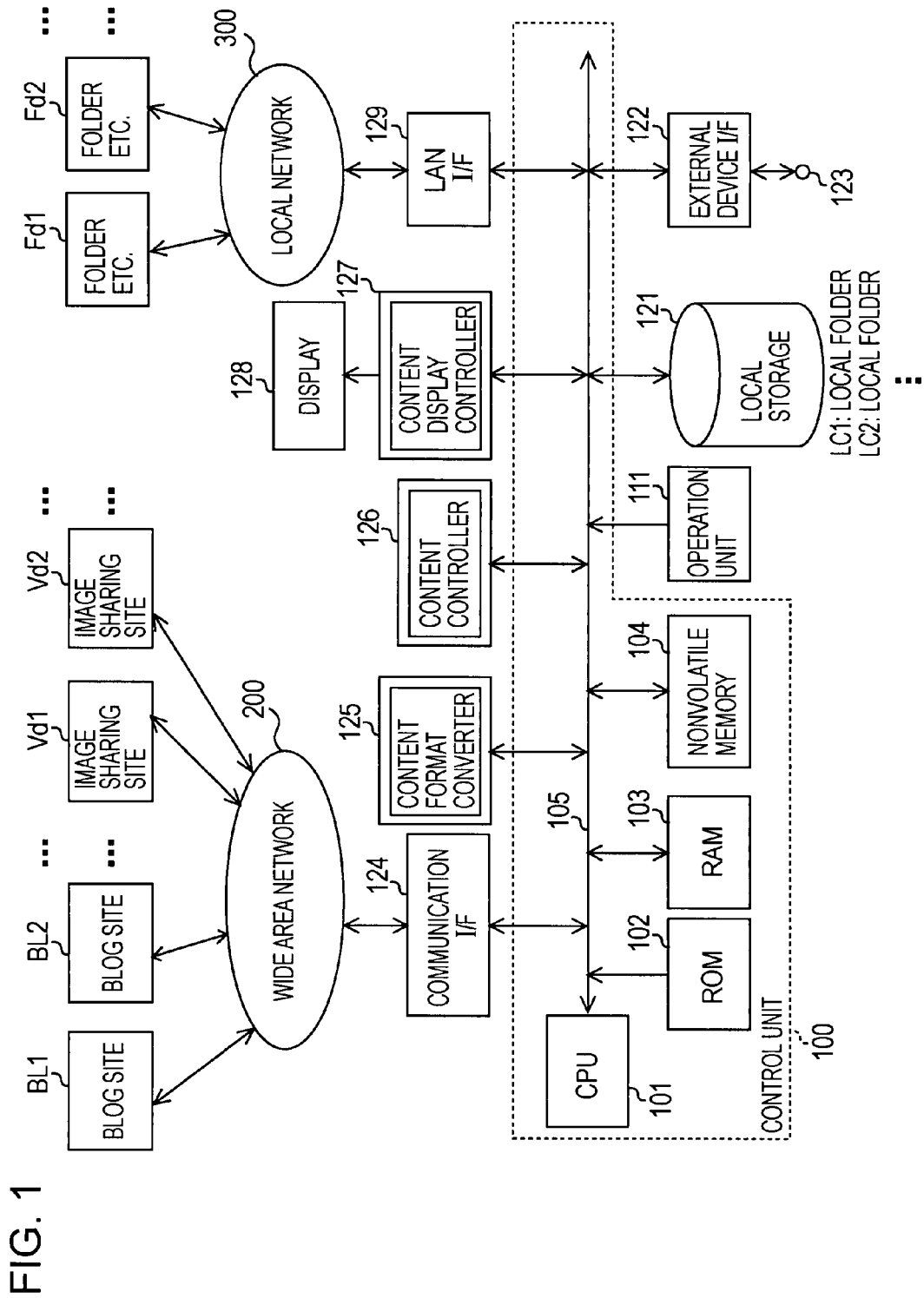
FIG. 1 is a block diagram illustrating a content viewing apparatus according to an embodiment of the present invention.

First, a content viewing apparatus using a method, an apparatus, and a program according to an embodiment of the present invention is described. FIG. 1 is a block diagram illustrating the content viewing apparatus according to the present embodiment of the invention. The content viewing apparatus according to the present embodiment may be implemented, for example, on a personal computer and may be installed and used, for example, in a home.

As shown in FIG. 1, the content viewing apparatus according to the present embodiment includes a control unit 100, an operation unit 111, a local storage 121, an external device interface 122, an external device input/output terminal 123, a communication interface 124, a content format converter 125, a content controller 126, a content display processing unit 127, a display 128, and a LAN (Local Area Network) interface 129.

The control unit 100 serves to control various parts of the content viewing apparatus according to the present embodiment, and, as shown in FIG. 1, the control unit 100 includes a CPU (Central Processing Unit) 101, a ROM (Read Only Memory) 102, a RAM (Random Access Memory) 103, and a nonvolatile memory 104 such as a flash memory or an EEPROM (Electrically Erasable and Programmable ROM), which are connected to each other via a CPU bus 105 so as to form a microcomputer.

The CPU 101 executes a program stored in the ROM 102 to produce various control signals and supply them to various parts, and to process signals received from various parts. Thus, the CPU 101 is a main part responsible for controlling the apparatus. The ROM 102 serves to store various programs executed by the CPU 101 and also store various data used in the execution of programs.

The RAM 103 is mainly used as a work area for temporarily storing intermediate data and the like. The nonvolatile memory 104 serves to store data which should be retained even after power of the content viewing apparatus is turned off. Examples of data stored in the nonvolatile memory 104 include various setting parameters, a program installed to extend functions of the content viewing apparatus, and data indicating a result of a process.

The operation unit 111 includes a keyboard including alphabetic keys, numeric keys, function keys, etc., a pointing device such as a mouse or a trackball, etc. If a user inputs data/command by operating the operation unit 111, the operation unit 111 produces an electric signal corresponding to the input data/command sends the electric signal to the control unit 100. In accordance with the command/data given by the user, the control unit 100 performs a process specified by the user.

The content viewing apparatus according to the present embodiment is configured to be capable of acquiring various contents such as Web pages provided by servers on the wide area network 200, contents available via the local network 300, contents stored in the local storage 121, and contents stored in external devices or data storage devices connected to the content viewing apparatus via the external device interface and the external device input/output terminal 123, and the content viewing apparatus displays acquired contents such that a user is allowed to view the acquired contents.

More specifically, the content viewing apparatus is capable of accessing the wide area network 200 such as the Internet via the communication interface 124 under the control of the control unit 100, and acquiring a wide variety of contents from sites on the wide area network 200. When a content is acquired from a site located on the wide area network, the content is acquired via an API (Application Program Interface) provided by the site.

That is, in the content viewing apparatus according to the present embodiment of the invention, in accordance with a command input by a user via the operation unit 111, the control unit 100 controls the communication interface 124 to acquire blog information or a content including photographic information and/or text information from a block site such as BL1, BL2, . . . , on the wide area network 200 or a content including still image data or motion image data from an image sharing site such as Vd1, Vd2, . . . , as shown in FIG. 1. As a matter of course, it is also possible to a content including still image data, motion image data, text data, music data, etc. from other sites.

In general, blog information includes a plurality of image data (photographic pictures) and/or text information. Similarly, a content acquired from an image sharing site generally includes a plurality of still image data or motion image data. As described above, in the present embodiment, the content viewing apparatus is capable of acquiring a content set including one or more contents such as Web pages or blog data from the same site (provider) via the communication interface 124.

In the present embodiment, the content viewing apparatus is capable of, under the control of the control unit 100, accessing a local network 300 via the LAN interface 129 and acquiring various contents such as still image data, motion image data, text data, music data, etc. from information devices connected to the local network 300.

More specifically, in the content viewing apparatus according to the present embodiment of the invention, in accordance with a command input by a user via the operation unit 111, the control unit 100 controls the LAN interface 129 to acquire various kinds of contents such as still image data, motion image data, text data, music data, etc. from folders Fd1, Fd2, . . . stored in storage media of information devices located on the local network 300 as shown in FIG. 1.

In this case, as with the above-described case in which contents are acquired via the communication interface 124, it is not necessarily needed that one content be acquired at a time, but it is possible to acquire blog data or the like including a plurality of contents such as photographic pictures, text information, etc, or acquire a plurality of still image data or motion image data from an image sharing site. That is, in the present embodiment, the content viewing apparatus is capable of acquiring a content set including one or more contents from the same source via the LAN interface 129 as in the case where a content set is acquired via the communication interface 124.

The content viewing apparatus according to the present embodiment is also capable of reading, for use by a user, various kinds of contents such as still image data, motion image data, text data, music data, etc. from the local storage 121 of the content viewing apparatus. For the above purpose, in the content viewing apparatus according to the present embodiment, under the control of the control unit 100, a content set including one or more contents is read from a local folder selected by a user via the operation unit 111 from a plurality of local folders LC1, LC2, . . . shown in FIG. 1, and the content set as a whole is processed.

The local storage 121 may be implemented using various types of storages such as a magnetic disk (for example, a hard disk), an optical disk (for example, a DVD (Digital Versatile Disc)), a magneto-optical disk (for example, MO (Magneto Optical Disk), or a semiconductor memory. In the present embodiment, by way of example, a hard disk drive, which allows realization of a high-capacity storage at a relatively low cost, is used as the local storage 121.

Furthermore, the content viewing apparatus according to the present embodiment is also capable of reading, for use by a user, various kinds of contents such as still image data, motion image data, text data, music data, etc. stored in external devices connected to the content viewing apparatus via the external device interface 122 and the external device input/output terminal 123. Also in this case as with the case in which contents are read from the local storage 121, the control unit 100 of the content viewing apparatus according to the present embodiment reads a content set including one or more contents at a time from a folder specified by a user via the operation unit 111, and processes the content set as a whole.

In the content viewing apparatus according to the present embodiment, the external device interface 122 and the external device input/output terminal 123 are implemented, for example, in accordance with the USB (Universal Serial Bus) standard or the IEEE (Institute of Electrical and Electronics Engineers) 1394 standard.

In the content viewing apparatus according to the present embodiment, as described above, the function of acquiring various content sets from sites on the wide area network 200 is realized by the cooperation of the communication interface 124 and the control unit 100, and the function of acquiring various content sets from folders or the like on the local network 300 is realized by the cooperation of the LAN interface 129 and the control unit 100.

In the present embodiment, the convent viewing apparatus includes the communication interface 124 and the LAN interface 129. Alternatively, the content viewing apparatus may include only a single interface, if accessing the wide area network 200 such as the Internet is performed via an access device (not shown) on the local network 300.

Furthermore, the function of acquiring content sets from the local storage 121 is realized by the control unit 100, and the function of acquiring content sets from external devices connected to the content viewing apparatus via the external device interface 122 and the external device input/output terminal 123 is realized by the cooperation of the external device interface 122 and the control unit 100.

When a content set is acquired by the content viewing apparatus in the above-described manner, the content set is supplied to the content format converter 125 via the control unit 100. The content format converter 125 converts the received content set into a predetermined format for use in the content format converter 125. The resultant content set is supplied to the content display controller 126.

More specifically, in the conversion process performed by the content format converter 125, if a content included in the acquired content set is in a format which cannot be handled by the content viewing apparatus, the content is converted into a format which can be handled by the content viewing apparatus. Furthermore, if a content included in the acquired content viewing apparatus does not include indication information for use in browsing contents, indication information corresponding to the content is produced. Furthermore, date/time information is extracted from each content of the acquired content set so that the date/time information can be used directly in various processes. If a content does not include date/time information, date/time information is produced according to a predetermined procedure.

For a content of still image data or motion image data, indication information for use in browsing contents may be a small-size image such as a thumbnail image indicating a content and allowing a user to select the content. In a case where a content is music data or audio data, indication information may be a symbolic image called an icon indicating that the content is music data or audio data and allowing a user to select the content.

For a content of music data, the indication information may be a thumbnail image of a jacket of an album of the music. For a content of text data such as a book review, the indication information may be a thumbnail image of the front cover of the book or a thumbnail image of the text of the book review. In a case where a content is a program, the indication information may be an icon for starting the program.

That is, indication information is a thumbnail image or an icon selectable to specify a content to be displayed. In a case where a content is text information, indication information may be a representation of a title in a predetermined size. For a content of motion image data, indication information may be partial image data (for example, a starting part) with a small size similar to the thumbnail size.

In a case where a content includes no date/time information, the content format converter 125 produces date/time information associated with the content. The date/time information may be produced so as to indicate a date determined based on a system date provided by a clock disposed in the content viewing apparatus. Alternatively, the date/time information may be produced so as to be equal to date/time information of another content which is included in the content set and which has latest or oldest date/time information.

Still alternatively, the date/time information may be produced depending on the location of the content such that the date/time information is set to be equal to date/time information of an immediately previous or following content, or set to be equal to a time in the middle between previous and following contents. When a content is image data, if there is another similar image data, date/time information may be produced based on date/time information of the similar image data. That is, when a content does not have date/time information, date/time information for this content may be produced according to a predetermined rule.

After the content set has been converted in terms of format by the content format converter 125, the content set is supplied, together with associated with including indication information such as thumbnail images or icons and date/time information, to the content controller 126.

If the content controller 126 receives the content set, the content controller 126 produces information that allows a user to view contents in the content set by analyzing the associated information of the content set or of each content, and arranging the indication information of the respective contents of the content set along a time axis in accordance with the date/time information associated with the respective contents. The resultant information is supplied to the content display processing unit 127. In accordance with the received information, the content display processing unit 127 displays indication information of each content on the display screen of the display 128.

The content display processing unit 127 produces a signal by which to display an image of indication information produced by the content controller 126 on the display screen of the display 128, and supplies the produced signal to the display 128. In accordance with the received signal, the display 128 displays the image of the indication information produced by the content controller 126 on the display screen of the display 128.

The display 128 includes a display device such as a LCD (Liquid Crystal Display), an EL (Electro Luminescence) panel, a PDP (Plasma Display Panel), or a CRT (Cathode Ray Tube) and also includes a control circuit for controlling the display device whereby an image is displayed on the display screen of the display device in accordance with a video signal supplied from the content display processing unit 127.

According to the present embodiment, the content viewing apparatus is configured to display a content selected from a plurality of content sets in an innovative manner such that a plurality of content sets are acquired from sites on the wide area network 200 or the local storage 121 on the local network 300 via the external device interface and the external device input/output terminal 123, and indication information corresponding to the respective contents included in the acquired content sets is displayed in parallel along the time axis so that a user is allowed to select a content in accordance with indication information of contents of content sets displayed along the time axis.

The indication information displayed in the form arranged along the time axis may be for external content sets or internal content sets or a combination of external and internal content sets. It is not necessarily needed to display indication information of a plurality of content sets in a parallel manner, but indication information of contents of a single content set may be displayed simply along the time axis so that a user is allowed to easily browse contents in accordance with time.

Functions of blocks enclosed by a dotted line in FIG. 1, i.e., functions of the content format converter 125, the content controller 126, and the content display processing unit 127 may be implemented by software executed by the control unit 100. In other words, the functions of the content format converter 125, the content controller 126, and the content display processing unit 127 are implemented in the control unit 100.

Overview of Operation of Content Viewing Apparatus

Figure 2:
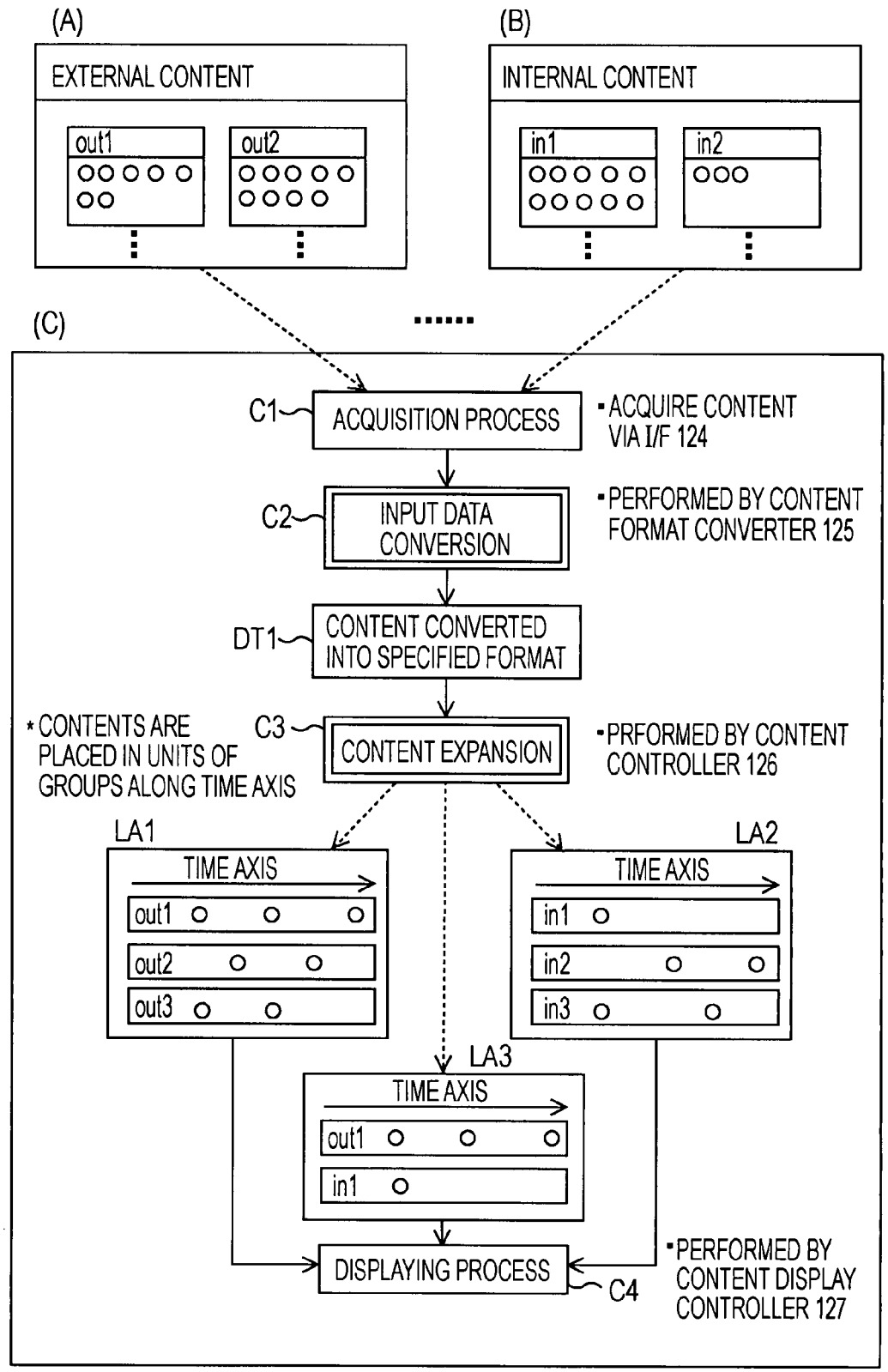
FIG. 2 illustrates an outline of a process performed by a content viewing apparatus.

FIG. 2 is a schematic block diagram for explanation of an operation of the content viewing apparatus according to the present embodiment. In FIG. 2, part (A) illustrates external contents (public data) available from sites on the wide area network 200 or available from devices on the local network 300. In part (A) of FIG. 2, out1, out2, and so on denote content sets each including one or more contents denoted by open circles.

In FIG. 2, part (B) shows internal contents (private data) which are stored in the local storage 121 or storages of external devices connected to the content viewing apparatus via the external device interface 122 and the external device input/output terminal 123. In part (B) of FIG. 2, in1, in2, and so on denote content sets each including one or more contents denoted by open circles.

In FIG. 2, part (C) illustrates a process performed by the content viewing apparatus according to the present embodiment. As shown in part (C) of FIG. 2, first, a content set is acquired in step C1. More specifically, in the content viewing apparatus according to the present embodiment, in accordance with a command issued by a user via the operation unit 111, the control unit 100 controls the communication interface 124 or the LAN interface 129 so as to acquire an external content set, or the control unit 100 controls the local storage 121 or the external device interface 122 to acquire an internal content set.

In step C2 shown in part (C) of FIG. 2, a conversion process is performed by the content format converter 125 to convert the format of the acquired external or internal content. As described above, the conversion process includes not only the conversion of the format of each content but also includes, as required, extracting or producing indication information for use in browsing contents and/or extracting or producing date/time information. Via this conversion process (step C2), the conversion of the format is performed as required, and furthermore indication information and/or date/time information are extracted or produced as required and thus a content DT1 in the predetermined format is obtained.

In step C3 shown in part (C) of FIG. 2, indication information corresponding to each content is arranged along the time axis according to the date/time information of each content for each content converted, into the predetermined format by the content controller 126. In this step, if there is another content set with indication information already arranged along the time axis, indication information is placed such that content sets are arranged in parallel so that there is no overlap in the same row between contents of different content sets.

For example, in a case where a plurality of external content sets out1, out2, and out3 are sequentially acquired, indication information of contents of the respective external content sets is arranged along the same time axis but in different rows depending on the external content sets such that one content set is arranged in one row, as shown in LA1 of part (C) of FIG. 2.

In a case where a plurality of internal content sets in1, in2, and in3 are sequentially acquired, indication information of contents of the respective internal content sets is arranged along the same time axis but in different rows depending on the internal content sets such that one content set is arranged in one row, as shown in LA2 of part (C) of FIG. 2.

In a case where an external content set out1 and an internal content set in1 are sequentially acquired, indication information of contents of the respective external and internal content sets is arranged along the same time axis but in different rows depending on the content sets such that one content set is arranged in one row, as shown in LA3 of part (C) of FIG. 2.

After indication information of respective contents of the acquired content sets is expanded as described above, the content display processing unit 127 produces a video signal corresponding to the indication information of the respective content in accordance with the expanded information, and supplies the resultant video signal to the display 128. The display 128 displays the indication information of the respective contents along the time axis in accordance with the video signal so that a user is allows to select indication information to view the corresponding content.

The indication information of contents of content sets may be scrolled in a forward or backward direction along the time axis so that display indication information of a desired content is displayed. Details of indication information a selected content may be displayed in response to a command input by a user.

In the content viewing apparatus according to the present embodiment, unlike the conventional browser or the like in which it is allowed to view only contents of a single content set (web page), it is allowed to view contents in convenient and innovative manners provided by the embodiment. That is, as described above, in a case where a single content set is acquired, date/time information of each content of the acquired content set is placed along the time axis so that it is possible to select a desired content to be viewed, according to the time indicated along the time axis. In a case where a plurality of content sets are sequentially acquired, indication information of each content of the acquired content sets is displayed along the time axis so that one content set is displayed in one row thereby allowing a user to select a desired content from the plurality of content sets according to the time indicated along the time axis.

In other words, indication information such as thumbnail images or icons for respective contents is displayed together in an integrated form regardless of whether contents are provided from sites on a network or from local folders, and it is possible to control displaying of indication information of all contents as a whole.

In the conventional apparatus, information is accessed separately and viewed separately depending on the source or the provider of the information, such as a blog site, an online image sharing site, a local folder, etc. In contrast, in the content viewing apparatus according to the present embodiment, information is displayed for all contents in an integrated fashion on a single viewer (viewing program) regardless of the type or the source of contents. Furthermore, it is possible to control of information for all contents as a whole on the single viewer simply by issuing an operation command (such as a scroll command or a command to display details of information).

Examples of Manners of Displaying Contents

Figure 3:
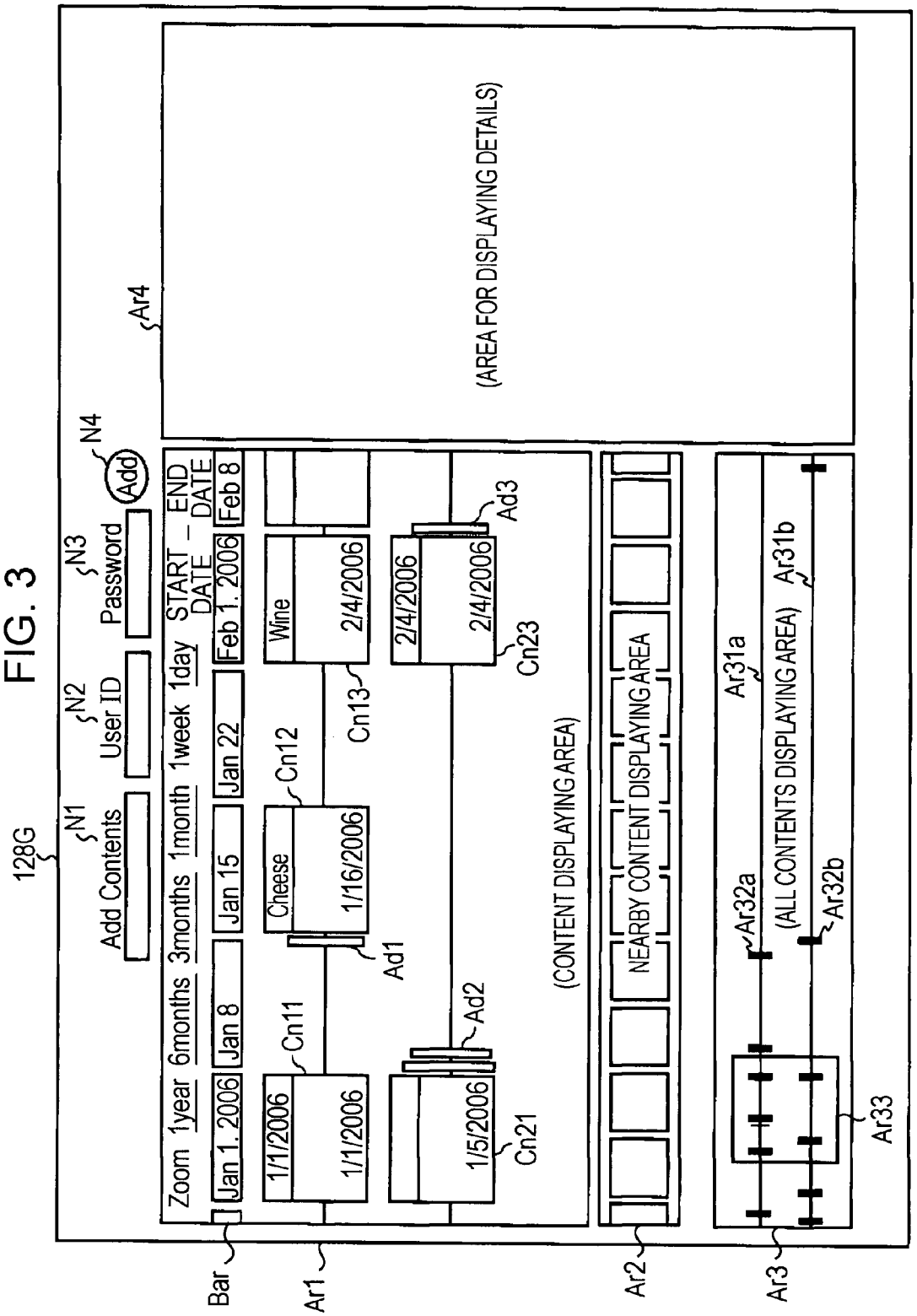
FIG. 3 illustrates an example of a mode in which contents are browsed and displayed.

Specific examples of manners of displaying contents on the content viewing apparatus according to the present embodiment are described below. FIG. 3 illustrates an example of a manner of displaying information for use in browsing of contents on a display screen 128G of the display 128 of the content viewing apparatus according to the present embodiment.

In the example shown in FIG. 3, the content viewing screen chiefly includes a content displaying area Ar1, a nearby-content displaying area Ar2, an all-contents displaying area Ar3, and a details displaying area Ar4.

The content displaying area Ar1 is an area for displaying indication information of contents acquired from the outside via a network such as the wide area network 200 or the local network 300 and indication information of contents acquired from an internal device such as a local storage, for all contents together. The nearby-content displaying area Ar2 is an area for displaying indication information of contents at locations close to a content selected by a user. The all-contents displaying area Ar3 is an area for displaying an overview of locations of indication information of all contents displayed in the content displaying area Ar1. The details displaying area Ar4 is an area for displaying detailed information of a selected content.

In an area at an upper location outside the content displaying area Ar1, fields N1, N2, and N3 for inputting data to specify a content set to be acquired and an icon (add icon) for issuing an acquisition command are disposed. The input field N1 is a field for inputting information, such as a site name or a folder name, indicating a location of a content set. The input field N2 is a field for inputting a user ID (user identification information) or information to narrow the range of contents. The input field N3 is a field for inputting a password.

After information is input into the input fields N1, N2, and N3 via the operation unit 111, if an ADD icon N4 is clicked in a state in which the ADD icon N4 is pointed to by a cursor, the control unit 100 controls one of the communication interface 124, the LAN interface 129, the local storage 121, and the external device interface 122 in accordance with the information input in the fields N1, N2, and N3 to acquire a specified content set. The control unit 100 then performs the conversion process and the expansion process described above so that indication information such as a thumbnail image of each content of content sets is displayed in the content displaying area Ar1, the nearby-content displaying area Ar2, the all-contents displaying area Ar3, and the details displaying area Ar4.

The content displaying area Ar1 in the content viewing screen in the example shown in FIG. 3 is described in further detail below. A shown in FIG. 3, at the top in the content displaying area Ar1, buttons for selecting a unit period (zoom level) are disposed. By changing the unit period, it is possible to increase or reduce the range within which contents are displayed.

In the specific example shown in FIG. 3, six selection button are disposed at the top of the content displaying area Ar1 such that it is possible to select the unit period from a predetermined group consisting of 1 year, 6 month, 3 months, 1 month, 1 week, and 1 day. In the example shown in FIG. 3, 1 week is selected as the unit period.

In a row below the row in which the unit period selection buttons are disposed, a period bar displaying area is disposed. In this period bar displaying area, period bars are displayed such that each period bar has a length equal to the unit period specified by selecting one of the unit period selection buttons. In the present example shown in FIG. 3, the display period is set such that the display period starts from the first day of January of 2006. In this case, because 1 week is selected as the unit period as described above, each period bar in the period bar displaying area has a length corresponding to 1 week.

More specifically, as shown in FIG. 3, period bars are displayed in the period bar displaying area of the content displaying area Ar1 such that a first period bar indicates one week from the 1st day to the 7th day of January of 2006, a second period bar indicates one week from the 8th day to 14th day of January of 2006, a third period bar indicates one week from the 15th day to 21st day of January of 2006, a fourth period bar indicates 10 days from the 22nd day to 31st day of January of 2006, and a fifth period bar indicates one week from the 1st day to 7th day of February of 2006.

The fourth period bar is exceptionally set to have a length corresponding to 10 days from the 22nd day to 31st day of January of 2006, so that the end of this period is set to the end of the month of January. As described above, when the unit period is set to 1 week, the length of each period bar is rounded so that the end of a month is coincident to the end of a period bar thereby making it possible to easily recognize a boundary between moths.

Alternatively, each period bar may be simply set to have a length of 1 week without exception. In the example described above, the fourth period bar may be set to have a length of 1 week from the 22nd day to 28th day of January of 2006 without rounding the period, and the fifth period bar may be set to have length of exact 1 week from 29th day of January to fourth day of February of 2006.

The indication information (thumbnail image or icon) of each content of the acquired content set is placed along the time axis according to the date/time information associated with each content and according to the selected unit period. In a case where a plurality of content set have been acquired, indication information of each content is displayed such that different content sets are displayed in different rows extending in parallel along the common time axis.

In the example shown in FIG. 3, a plurality of pieces of indication information Cn11, Cn12, Cn13, ... corresponding to contents of a first content set are displayed in one row along the time axis, and a plurality of pieces of indication information Cn21, Cn22, ... corresponding to contents of a second content set are displayed in another row parallel to the first content set along the same time axis such that the indication information of each content is located below a corresponding period bar according to the selected unit period.

In the case of the content displaying area Ar1 shown in FIG. 3, the content indication information Cn11 of the first content set and the content indication information Cn21 of the second content set have date/time information corresponding to the first period (from the 1st day to 7th day of January of 2006), and thus they are displayed at locations below the first period bar.

The content indication information Cn12 of the first content set has date/time information corresponding to the third period (from the 15th day to 21st day of January of 2006), and thus this indication information Cn12 is displayed at a location below the third period bar. The content indication information Cn13 of the first content set and the content indication information Cn22 of the second content set have date/time information corresponding to the fifth period (from the 1st day to 7th day of February of 2006), and thus they are displayed at locations below the fifth period bar.

In the present example, as can be seen from the illustration of information displayed in the content displaying area Ar1 shown in FIG. 3, it is possible to view the indication information of respective contents of two different content sets (first and second content sets) displayed along the time axis.

In the content viewing apparatus according to the present embodiment of the invention, it is possible to scroll indication information in a direction along the time axis depending on the selected unit period (zoom level). For example, when the unit period is set to 1 year, it is allowed to scroll indication information in units of 1 year. If the unit period is set to 1 week, it is allowed to scroll indication information in units of 1 week. That is, by selecting the unit period and by using the scroll function, it possible to browse contents in long unit periods such as in units of 1 year, or conversely in short unit periods such as 1 month or 1 week.

As shown in FIG. 3, date/time information, title information, or the like of each content is displayed in the indication information (thumbnail image or icon) of the corresponding content displayed in the content displaying area Ar1. In FIG. 3, rectangles Ad1, Ad2, and Ad3 partially seen behind some pieces of content indication information in the content displaying area Ar1 indicate presence of other contents in the corresponding unit periods.

For example, the rectangle Ad1 indicates the presence of indication information of a content with date/time information earlier than that of the content indication information Cn12. Similarly, the rectangle Ad2 indicates the presence of indication information of a content with date/time information later than that of the content indication information Cn21. The rectangle Ad3 indicates the presence of indication information of a content with date/time information later than that of the content indication information Cn22. If the rectangle Ad1, Ad2, or Ad3 is clicked with a cursor, the clicked content indication information appears on the top.

Furthermore, in the content viewing apparatus according to the present embodiment, the start date and the end date of the range of date of displayable contents are displayed in the upper right corner of the content displaying area Ar1 so that a user can recognize the range over which content date is distributed.

Next, the nearby-content displaying area Ar2 is explained below. As described above, the nearby-content displaying area Ar2 is an area for displaying indication information of contents which are close in location to a content selected by a user. Herein, the term "close" is used to express that contents are close in time indicated by date/time information to the content selected by the user. Thus, contents at close locations in time before and after the content selected in the content displaying area Ar1 by the user are extracted and indication information thereof is displayed.

In the nearby-content displaying area Ar2, indication information in the form of thumbnails or the like corresponding to contents is displayed in the order of time such that indication information is arranged at equal intervals in one line. That is, in the nearby-content displaying area Ar2, indication information of contents is displayed at equal intervals regardless of actual time intervals so that even contents which are displayed in an overlapped manner at the same date location or in the same unit period in the content displaying area Ar1 are displayed without being overlapped.

The information in the nearby-content displaying area Ar2 may be displayed in connection with the information displayed in the content displaying area Ar1. For example, a content selected in the content displaying area Ar1 may be displayed in the middle of the nearby-content displaying area. Conversely, when a content is selected in the nearby-content displaying area Ar2, the information displayed in the content displaying area Ar1 may be scrolled so that the selected content is displayed in the middle of the content displaying area Ar1.

The indication information such as thumbnails of contents in the nearby-content displaying area Ar2 may be displayed for all content sets displayed in the content displaying area Ar1 or only for a content set specified by a user.

As described above, the nearby-content displaying area Ar2 allows a user to view even indication information of contents which are in the same unit period as that of other contents and which are thus hidden behind other contents in the content displaying area Ar1. This makes it possible for a user to view indication information of a content of interest together with indication information of contents close in location to the content of interest.

Next, the all-contents displaying area (scroll area) Ar3 is explained. The all-contents displaying area Ar3 is an area for displaying information associated with all contents of content sets displayable in the content displaying area Ar1. In the all-contents displaying area Ar3, the period to be displayed is set to be capable of displaying all information of contents within the period from the oldest time to the latest time indicated by date/time information of contents in content sets of interest, and information is displayed such that locations of contents are indicated on the time axis for the respective content sets of interest.

In the example shown in FIG. 3, as many horizontal lines (time axes) Ar31a and Ar31b as there are content sets of interest are displayed in the all-contents displaying area Ar3, and marks Ar32a, Ar32b, etc. being thin or thick and extending in a direction perpendicular to the horizontal lines Ar31a and Ar31b are displayed at locations corresponding to the locations of the contents so as to indicating the locations of contents.

Furthermore, in the all-contents displaying area Ar3, a rectangular Ar33 is displayed to indicate the range of indication information displayed in the content displaying area Ar1 so that a user can easily understand at which part of the total range of content sets, contents displayed in the content displaying area Ar1 are located, and understand the range of date of contents displayed in the content displaying area Ar1. Furthermore, the user can also understand whether there are other contents outside the rectangular Ar33 and can roughly estimate the number of contents located outside the rectangular Ar33.

It is possible to scroll the information displayed in the content displaying area Ar1 by dragging the rectangle Ar33 which is displayed in the all-contents displaying area Ar3 to indicate the range of contents displayed in the content displaying area. That is, the all-contents displaying area (scroll area) Ar3 also as a function similar to a scroll bar.

Next, the details displaying area Ar4 is explained. The details displaying area Ar4 has a relatively large area and is displayed on the right-hand side of the display screen. If indication information of a content displayed in the content displaying area Ar1 or the nearby-content displaying area Ar2 is pointed to by a cursor and clicked, the content is selected and detailed information thereof is displayed in the details displaying area Ar4.

For example, when a content of a blog site is selected, information provided by the blog site is displayed, in the same layout as the original layout, in the details displaying area Ar4. In a case where a content of an online image sharing site or an image file stored in a local folder is selected, the selected image is enlarged into its original size or reduced if necessary and displayed in the details displaying area Ar4. When a music content stored in a local folder is selected, a title, an artist name, and a jacket image are displayed in the details displaying area Ar4. In this case, the selected music content may be played back while the image is displayed in the details displaying area Ar4.

In the content viewing apparatus according to the present embodiment, information is displayed on the display screen of the display 128 such that indication information of each content of each of one or more content sets is displayed in the content displaying area Ar1 along the same time axis. When there are a plurality of content sets, different content sets are displayed in different lines parallel to each other along the same time axis. That is, contents of various content sets are displayed along the time axis so that a user is allowed to easily view the contents and easily make a comparison among contents.

On the other hand, information in the nearby-content displaying area Ar2 displayed on the display screen of the display 128 makes it possible for a user to correctly recognize what contents are included in content sets, even in a case where there are a plurality of contents in a unit period (zoom level) selected by a user and all indication information of these contents cannot be displayed at a time in the content displaying area Ar1.

Of information displayed on the display screen of the display 128, information displayed in the all-contents displaying area Ar3 makes it possible for a user to visually recognize relative locations of contents of respective content set along the time axis. It is possible to easily recognize the density of contents and easily specify the range of contents to be displayed in the content displaying area Ar1.

In the other hand, detailed information of a content selected by a user is displayed in the details displaying area Ar4 to allow a user to recognize the details of the content in addition to information provided by the content indication information in the form of a thumbnail image or an icon displayed in the content displaying area Ar1 or the nearby-content displaying area Ar2.

In the content viewing apparatus according to the present embodiment, unlike the conventional browser which allows a user to simply view information of a single content set, indication information of contents is displayed in the innovative manner which is very convenient for users as described above. That is, contents of one content set are displayed in one line along the time axis, and contents of another content set are displayed in another parallel line along the same time axis so that it is possible to easily browse contents of the respective content sets and it is possible to easily make a comparison among the content sets. Thus, it is possible to very efficiently use various digital contents distributed across network storages and/or local storages.

Details of Displaying of Information in Content Displaying Area

Figure 4:
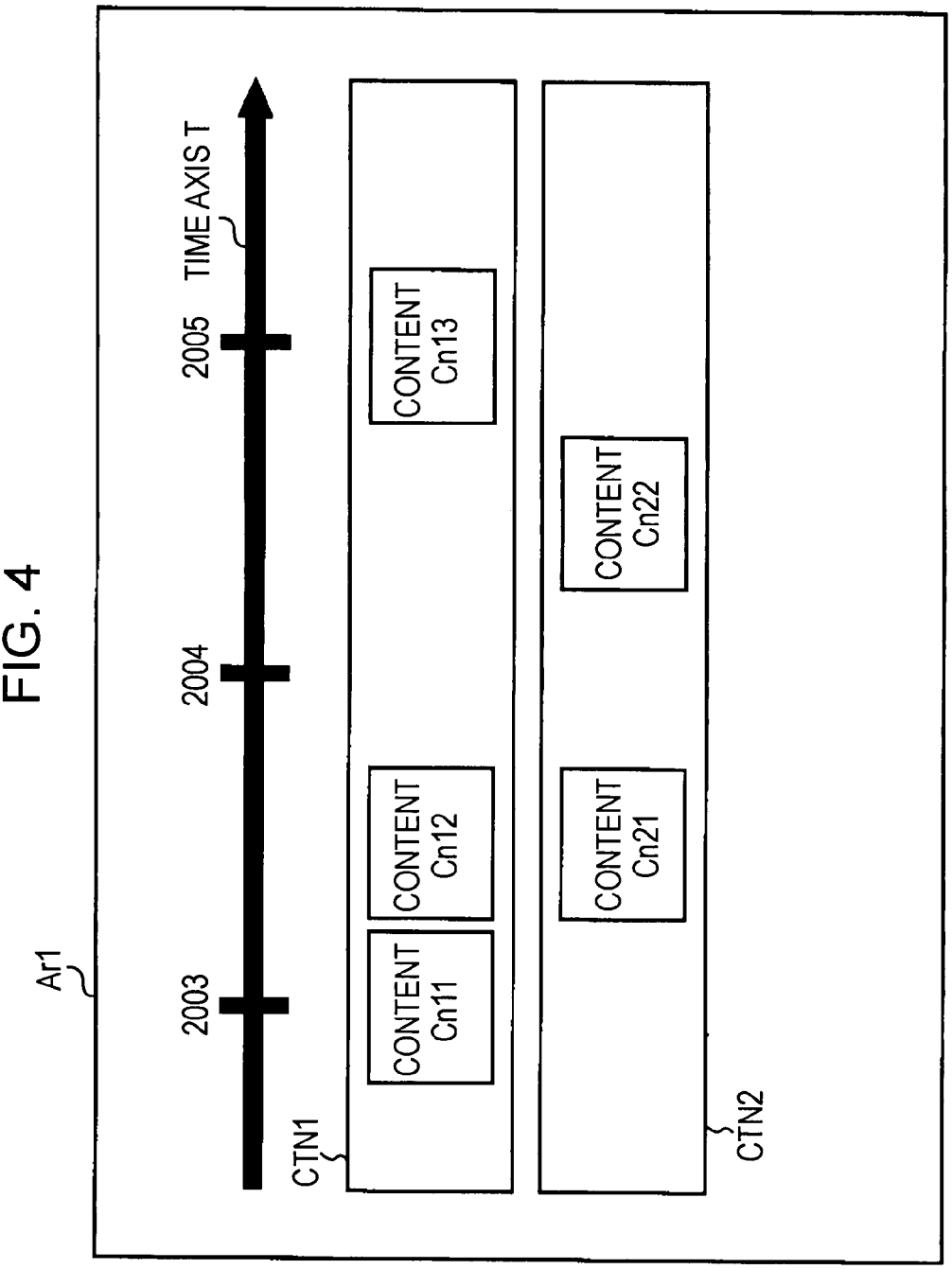
FIG. 4 illustrates an example of a content displaying area.

Displaying of information in the content displaying area Ar1 is described in further detail below. FIG. 4 illustrates an example of a manner in which information is displayed in the content displaying area Ar1. Information displayed in the content displaying area Ar1 includes a time axis T (corresponding to the period bar displayed period bar displaying area shown in FIG. 3) which is used in common for all content sets, containers CTN1, CTN2, . . . produced for the respective acquired content sets, and indication information Cn11, Cn12, Cn13, . . . , Cn21, Cn22 . . . in the form of thumbnail images or icons disposed in the corresponding containers.

A container is produced each time a content set is read from a site on a wide area network or a local network or from a local storage or from an external device connected to the content viewing apparatus via the external device interface 122, and the container is stacked in a downward direction. More specifically, when a first content set is read from a blog site or the like, a container for this content set is produced and placed at the top of the content displaying area Ar1 as with a container CTN1 shown in FIG. 4. If contents are then read from an online image sharing site, a container CTN2 for these contents is produced and placed below the container CTN1 as shown in FIG. 4.

Indication information (entry) of each content in each container is placed at a location corresponding to a time indicated by date/time information associated with the content along the time axis. Therefore, a plurality of pieces of indication information (entries) of contents of content sets are displayed along the same axis regardless of which sites the content sets are read from, such that contents of one content set are located in one line and contents of another content set are located in another parallel line whereby it becomes possible to easily view contents of a plurality of content sets in the same content displaying area Ar1. If the time axis is scrolled or zoomed, locations of entries of in the respective containers are correspondingly moved. That is, it is possible to correctly move the locations of all entries of contents received from a plurality of sites simply by scrolling or zooming the time axis.

As described above, one container is produced for each content set and indication information (entry) of each content is displayed in the container. This makes it possible to perform various processes in units of containers, such as (1) deleting of a container (content set), (2) exchanging container in terms of displaying locations, (3) combining containers, (4) moving a container along the time axis, (5) enlarging or reducing of a time scale for a container, and (6) automatically updating a container, as described in detail below.

(1) Deleting of Container (Content Set)

First, deleting of a container is explained with reference to FIG. 5. In FIG. 5, part A shows an initial state, and part B shows a state in which a container has been deleted.

In the state shown in part An of FIG. 5, three content sets have been read, three containers CTN1, CTN2, and CTN3 for the respective content sets have been produced, and indication information (entry) of each content in each container has been displayed. In this state, if a command to delete, for example, the container CTN2 is issued by pressing a delete key on the operation unit 111 while pointing to the container CTN2 in the second row with a cursor, the control unit 100 controls the content display processing unit 127 to delete the container CTN2 and move the container CTN3 to the second row as shown in part B of FIG. 5.

As described above, when a container in the second row is deleted, a container in the third row is moved to the second row so that no unnecessary space is created by deleting.

In the example described above, by way of example, the container CTN2 in the second row is deleted. Deleting is not limited to the container in the second row, but other containers such as a container in the first row or the third row can be deleted. If there are containers in rows below a deleted container, locations of these containers are shifted upward by one row.

(2) Exchanging of Locations of Containers

Next, exchanging of locations of containers is explained with reference to FIG. 6. In FIG. 6, part A shows an initial state, and part B shows a state in which locations of containers have been exchanged.

In the state shown in part An of FIG. 6, three content sets have been read, three containers CTN1, CTN2, and CTN3 for the respective content sets have been produced, and indication information (entry) of each content in each container has been displayed. In this state, if, for example, the container CTN2 in the second row is dragged and dropped onto a location below the container CTN3 in the third row, then the locations of the container CTN2 in the second row and the container CTN3 in the third row are exchanged, that is, the container CTN3 moves upward to the second row and the container CTN2 moves downward to the third row, as shown in part B of FIG. 6.

Thus, a user is allowed to move a content set which is more important for the user to an upper row, or to move a content set to a row directly above or below another content set so that it becomes easier to make a comparison between these two content sets. That is, even in a state in which a plurality of content sets are displayed in parallel, it is possible to easily view contents of the respective content sets in a very efficient manner.

(3) Combining of Containers

Next, combining of containers is explained with reference to FIG. 7. In FIG. 7, part A shows an initial state, and part B shows a state in which containers have been combined.

In the state shown in part An of FIG. 7, three content sets have been read, three containers CTN1, CTN2, and CTN3 for the respective content sets have been produced, and indication information (entry) of each content in each container has been displayed. In this state, if, for example, the container CTN3 in the third row is dragged and dropped onto the container CTN2 in the second row, indication information (entry) of contents originally included in the container CTN2 in the second row and indication information (entry) of contents originally included in the container CTN3 in the third row are combined into a container in the second row as shown in part B of FIG. 7. That is, the container CTN2 in the second row and the container CTN3 in the third row are combined together.

In this combining process, if there a plurality of pieces of indication information (entries) of contents at the same time (in the same unit period), the plurality of pieces of indication information are displayed in a partially overlapping manner, as with the case of Cn21 and Cn32 and with the case of Cn22 and Cn33 in the example shown in part B of FIG. 7, so that a user can understand there are plurality of pieces of indication information.

For example, in a case where photographic pictures taken by friends during a travel are acquired from an online image sharing site, if containers are combined together after pictures are read from the site into different containers, then it becomes possible to view all pictures taken during the travel in a single container. As described above, combining of containers is performed to place contents having a close relation in a single container.

(4) Moving of Container Along Time Axis

Next, moving of a container in a direction along the time axis is explained with reference to FIG. 8. In FIG. 8, part A shows an initial state, and part B shows a state in which a container has been moved.

In the state shown in part An of FIG. 8, two content sets have been read, two containers CTN1 and CTN2 for the respective content sets have been produced, and indication information (entry) of each content in each container has been displayed. In part A of FIG. 8, if the container CTN2 in the second row is dragged to the left as represented by an arrow a, then all contents in the container CTN2 in the second row move to the left as shown in part B of FIG. 8. Conversely, in a case where dragging is performed to the right, all entries moves to the right.

That is, moving of a container along the time axis is performed when it is desired to shift date/time information by the same amount for all contents in a particular content set. For example, the time of posting to a blog site is expressed by a clock of the blog site, while the time of storing image data in a local folder is expressed by a clock disposed in a digital camera used to take a picture.

For example, when there is a difference of one hour between the time measured by the clock disposed in the digital camera and the time measured by the clock in the blog site, it is possible to adjust the time between the local folder and the blog site by shifting the time of the container by one hour after data is read into the local folder. In a case where pictures of two children taken as children grew are read into different two containers, if one of the two containers is shift by an amount corresponding to a difference in age so that the apparent birthdays of two children become equal, it becomes possible to easily compare the growth process between the two children.

(5) Enlarging or Reducing of a Time Scale for a Container

Next, enlarging or reducing of a time scale for a container is explained with reference to FIG. 9. In the state shown in part An of FIG. 9, two content sets have been read, two containers CTN1 and CTN2 for the respective content sets have been produced, and indication information (entry) of each content in each container has been displayed.

Figure 9:
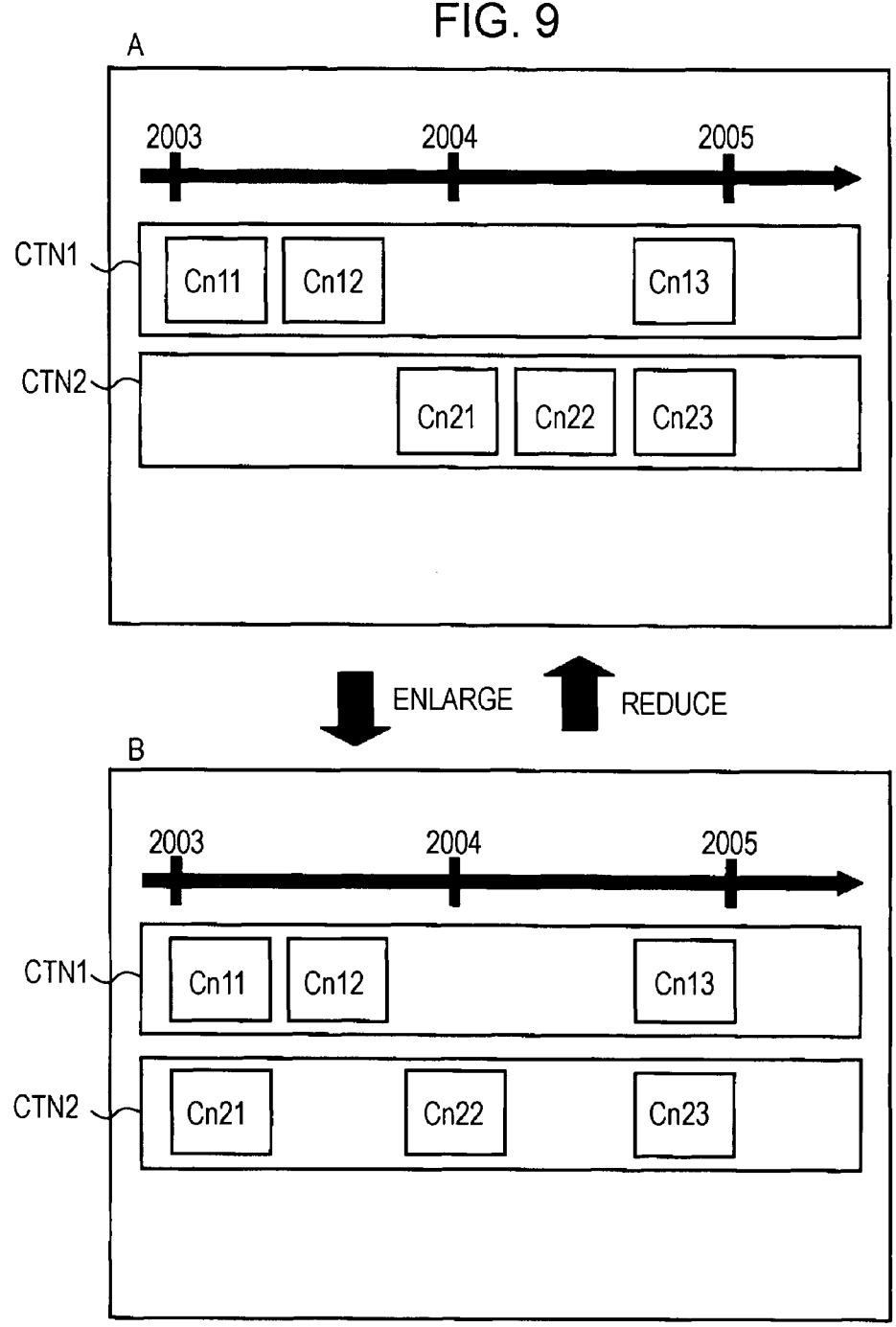
FIG. 9 is a diagram for explanation of enlarging or reducing a time scale for a container.

If, for example, the indication information Cn23 in the container CTN2 in the second row is pointed to with a cursor to specify it as a base in the expansion of the time scale, and if a command to expand the time scale by a factor of, for example, 2 is issued, then, as shown in part B of FIG. 9, intervals of content indication information Cn21, Cn22, and Cn23 in the container CTN2 in the second row are expanded by a factor of 2 toward the past with respect to the indication information Cn23 selected as the base.

Conversely, in the state shown in part B of FIG. 9, if the indication information Cn23 in the container CTN2 in the second row is pointed to with a cursor to specify it as the base, and if a command to reduce the time scale by a factor of 2 (reduce time scale to ½) is issued, then intervals of content indication information Cn21, Cn22, and Cn23 in the container CTN2 in the second row are reduced by a factor of 2 with respect to the indication information Cn23 into the state shown in part An of FIG. 9.

This function is convenient to compare content sets with different time spans to each other. For example, if a personal history of a hero such as Ieyasu Tokugawa is displayed at intervals expanded such that the length of the life becomes equal to the length of the average life of today, it is possible to compare the life of the hero with the life of a user. This function may also be used to expand/reduce the span of a day trip, an overnight trip, an one week trip, etc. so as to have an equal span, and to display the respective trips in an equal span.

In the example described above, it is assumed that expansion/reduction of the time axis is performed for a specified single container. Note that the time axis can be expanded/reduced for all content sets displayed in the content displaying area Ar1 simply by changing the unit period (zoom level) in the manner described above.

(6) Automatic Updating of Container

Next, automatic updating of a container is explained with reference to FIG. 10. In the state shown in part An of FIG. 10, two content sets have been read, two containers CTN1 and CTN2 for the respective content sets have been produced, and indication information (entry) of each content in each container has been displayed.

If the operation mode is set so as to automatically update a content set corresponding to a container CTN2 in the second row at intervals of one minute and if the setting is stored in the nonvolatile memory 1104 of the control unit 100 according to a command issued via the operation unit 111, then the control unit 100 accesses the source of the content set corresponding to the container CTN2 at intervals of one minute according to a clock (not shown) to check whether there is a new content. If there is such a content, the control unit 100 acquires the new content, converts the acquired content into the predetermined format, and displays indication information of the content in the container CTN2 according to date/time information associated with the content.

Thus, if the new content is added to the content set corresponding to the container CTN2, indication information of the added content (indication information Cn24 in the example shown in part B of FIG. 10) is added to the container CTN2. The source of the content set can be identified based on the information which has been input via the fields N1, N2, N3, a N4 specifying the content set and stored in the nonvolatile memory 104.

When a user is viewing a blog site, if somebody posts a new article to this blog site, the content information is updated at a next automatic updating interval, and the content including the new article is acquired. If the content viewing apparatus has a mail function or a chat function, it is possible to directly communicate with a person who has posted the new article.

As described above, for containers displayed in the content displaying area Ar1 which is a main display area used to browse various contents, it is possible to perform the following processes, (1) deleting of a container (content set), (2) exchanging container in terms of displaying locations, (3) combining containers, (4) moving a container along the time axis, (5) enlarging or reducing of a time scale in displaying containers, and (6) automatic updating of containers, whereby it is possible to display information associated with contents of content sets in a manner which allows a user to easily browse and view the information.

Data Format of Contents

Figure 11:
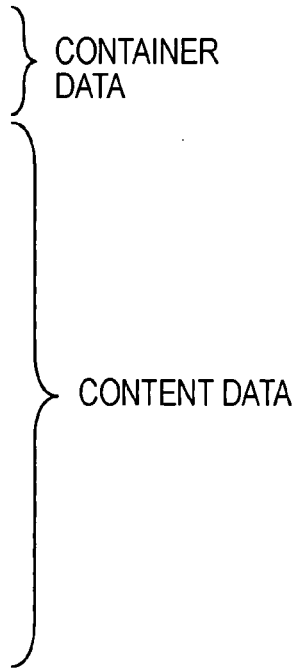
FIG. 11 illustrates an example of content data described in the XML format.

The data format of contents handled by the content viewing apparatus according to the present embodiment is described below. FIG. 11 illustrates an example of content data described in the XML (eXtensible Markup Language) which can be handled by the content viewing apparatus according to the present embodiment.

As shown in FIG. 11, the content data includes two main parts, i.e., container data and content data. The container data includes "title" indicating a name of the source of the content such as an external site or a local storage and also includes "author_name" indicating an author. The content data includes a plurality of content data each of which includes "year", "month", and "date" indicating the date of the content, "hour", "minute", and "second" indicating the time of the content, "title" indicating the title of the content, "icon" representing the icon indicating the content, "body" representing the body of the content, and "link" indicating the URL of the location of the original content.

Note that the content data does not necessarily need all items described above. For example, in the case of a content supplied from a blog site, if an article does not include an image, "icon" may be omitted. In the case where an article includes an image, if there is no "icon", a "icon" may be produced from the image. In the case of a content provided by an online image sharing site, if there is no title or description of an image, "title" and/or "body" may be omitted, or "title" and/or "body" may be produced from a file name or a content of the file.

The location of the indication information such as a thumbnail image or an icon of each content is determined according to date/time information, which is a combination of date information and time information extracted from the content data. According to the date/time information, the location of the indication information of the content on the time axis is determined, and the indication information of the content is automatically placed at the determined location. The date information or the time information in the date/time information may be omitted depending on the zoom level (unit period). For example, when the zoom level is set to "1 year", the location of the content may be determined according to only "year" information in the date information.

As described above, a content set acquired from the outside via a network or a content set read into the local storage from an external device directly connected to the content viewing apparatus is converted into the format such as that shown in FIG. 11 by the content format converter 125 of the content viewing apparatus according to the present embodiment In the case a content set is acquired from a blog site, an API of the blog site is accessed, and content data acquired via the API is converted into the format such as that shown in FIG. 11. The data conversion is performed in a manner depending on the source (provider) of content set, such as an external site, a local storage, an external device, etc.

Operation of Content Viewing Apparatus

Figure 12:
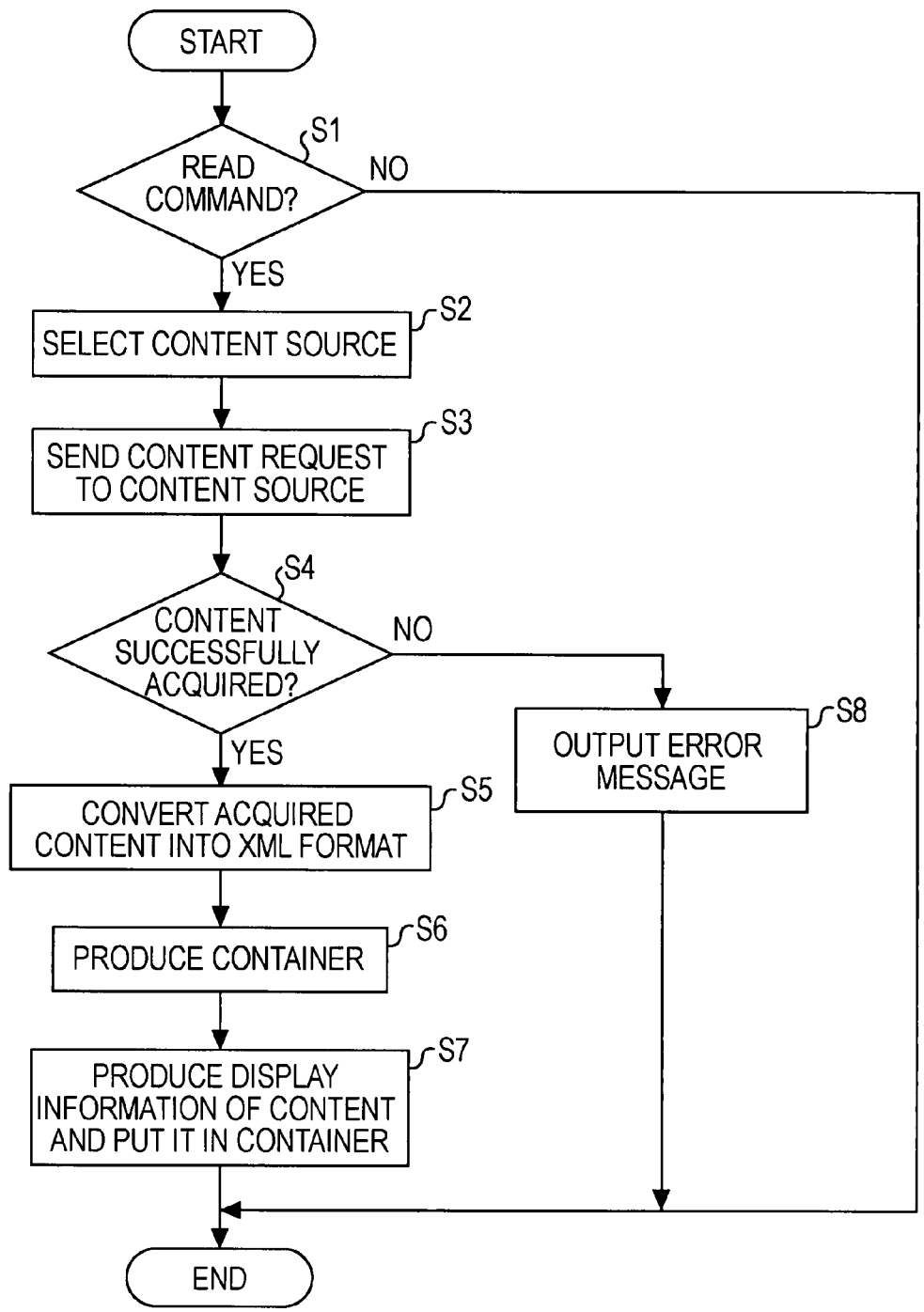
FIG. 12 is a flow chart illustrating a process of acquiring a content set and displaying it.

Now, an operation of the content viewing apparatus according to the present embodiment is described below with reference to FIG. 12. FIG. 12 is a flow chart illustrating a process performed by the content viewing apparatus to acquire a content set and displaying it.

Note that the process shown in FIG. 12 is performed by the control unit 100 of the content viewing apparatus according to the present embodiment repeatedly at predetermined intervals. If the process shown in FIG. 12 is started, the control unit 100 first checks whether a command to read a content set has been issued by a user (step S1).

The read command includes data specifying which content set should be read from which external site or local storage. More specifically, for example, it is specified to read a content set with a blog title of "abc" (or a user name) from a site of "XXX Blog". If a password is required, the password is input when the read command is issued.

If it is determined in step S1 that no read command has been issued, the process shown in FIG. 12 is ended. In a case where it is determined in step S1 that the read command has been issued, the control unit 100 analyzes the read command input in step S1 to identify the source (provider) of the specified content set (step S2). More specifically, the control unit 100 detects an external site or a local storage from which to acquire the specified content set, and activates the acquisition means (the communication interface 124, the LAN interface 129, the local storage 121, and the external device interface 122) for accessing the detected external site or the local storage and acquiring the content set, and conversion means (the content format converter 125) for converting the acquired content set into the XML format.

The control unit 100 then sends a content acquisition request to the determined external site or the local storage via the acquisition means activated in step S2 (step S3). If necessary, a user name or a password is also transmitted.

The control unit 100 acquires data of the specified content set specified by the user from the content source (content provider). In step S4, the control unit 100 determines whether the data of the specified content set has been successfully acquired. If it is determined in step S4 that the control unit 100 has failed to acquire the data of the specified content set, the control unit 100 outputs an error message indicating the failure of acquiring the data of the specified content set (step S8), and the control unit 100 then ends the process shown in FIG.

12. The failure of acquisition of the content can occur when timeout occurs in accessing the network, accessing is rejected, or the login name or the password is invalid. The error message may include data indicating why the failure has occurred.

If it is determined in step S4 that the data of the specified content set has been successfully acquired, the control unit 100 supplies the data of the specified content set acquired in step S4 to the content format converter 125 to convert the acquired data into the XML data so that the data can be handled in the content viewing apparatus (step S5). Although the data is converted into the XLM format in the present example, it is not necessarily needed to convert the data into the XLM format, but it is allowed to convert the data into an arbitrary format such as the CSV (Common Separated Values) format as long as the format can be handled by the content viewing apparatus.

The control unit 100 then controls the content controller 126 to produce a container from the XML data output in step S5 from the content format converter 125 (step S6). In this step, a title and a producer of the container are also defined. An icon or an image indicating the source of the content such as the external site or the local storage may be assigned to the container.

The control unit 100 then produces indication information in the form of a thumbnail image or an icon for the content from the XML data produced in step S5 by the content format converter 125, and the control unit 100 places the resultant indication information of contents in the container produced in step S6, in accordance with the date/time information of each content (step S7).

The indication information of each content placed in the container may be a thumbnail image or an icon, or may be index information including only a title and an icon. In a case where no icon is available, a title and a part of a first sentence of the body may be displayed. That is, the indication information may be in an arbitrary form as long as the indication information allows a user to identify the content.

Thus, the container for the acquired content set is produced, and the indication information of each content is placed in the container according to the date/time information of each content whereby the content set is displayed in the content displaying area Ar1 as shown in FIG. 3.

In step S7 described above, concurrently with the process of placing the indication information of each content in the container, the process of producing indication information to be displayed in the details displaying area Ar2 and the all-contents displaying area Ar3 is also performed.

The process shown in FIG. 12 is performed each time a command to acquire a content set is issued by a user, and content sets acquired via the repetition of the process shown in FIG. 12 are displayed along the same time axis but different content sets are displayed in different lines as described above with reference to FIG. 3 so that a user is allowed to view all indication information of the content sets.

In the present embodiment, as described above, by performing the process shown in FIG. 12, the content viewing apparatus acquires content sets from external sites such as a blog site or an online image sharing site or a local storage, and places containers and indication information of contents along the time axis so that a user is allowed to view all content sets.

In a case where it is allowed to edit information including titles of contents, bodies, date/time information, etc., the edited data may be sent to the provider (source) of the contents to request the provider to edit the original data. This makes it possible to modify a body of a blog, add a title or a comment to an image, adjust the date/time of the blog to be consistent with the date/time of an image, etc.

The content viewing apparatus according to the present embodiment is capable of collecting content sets from various sites on network or from local storages and displaying information associated with the acquired content sets in an integrated fashion, and it is possible to control displaying of information as a whole.

It is also possible to display indication information of various kinds of contents such as text, a still image, a motion image, a voice/sound, and/or an arbitrary combination thereof in an integrated manner, and it is possible to control displaying of information as a whole. A plurality of acquired contents are placed in a container, and it is allowed to perform a process in units of containers, such as deleting a container, exchanging containers, combining containers, moving a container along the time axis, expanding/reducing the time scale for a container, and automatically updating a container. This makes it possible to move a plurality of containers to desired locations to make a comparison between them.

Implementation of the Invention by Software

In the examples described above, the content viewing apparatus is realized using the method and the apparatus according to embodiments of the invention. The functions of the content viewing apparatus realized in the examples described above may also be implemented by software as described below.

More specifically, the content viewing program may be executable by a computer of a content viewing apparatus including acquisition means for acquiring one or more contents, conversion means for converting the acquired contents as required, arrangement means for arranging indication information of the contents and displaying the indication information at arranged locations, and display control means for controlling displaying of the indication information displayed on the display device, to perform a process including the steps of acquiring, via the acquisition means, a content set including one or more contents, converting, via the conversion means, each content in the content set acquired by the acquisition means into a predetermined format, arranging, by the arrangement means, indication information to be displayed on a display device to make it possible to use each content, such that the indication information is arranged along a time axis according to date/time information associated with each content subjected to the conversion performed by the conversion means, and displaying, via the display control means, the indication information of each of all contents arranged, by the arrangement means, so as to be displayed along the time axis on the display device in accordance with an operation command input by a user.

More specifically, the acquisition means including the control unit 100 for controlling the communication interface 124, the LAN interface 129, and the local storage and also including the external device interface 122, the content format converter 125, the content controller 126, and the content display processing unit 127 may be implemented by executing the content viewing program including the steps shown in FIG. 12.

By execute the software to repeatedly perform the process described above with reference to FIG. 12, it is possible to display indication information of contents of a plurality of content sets in such a manner that indication information of contents is arranged along the time axis in different parallel lines depending on the content sets as described above with reference to FIG. 3.

For example, using software, it is possible to control the content display processing unit serving as the display control means so as to perform (1) deleting of a container (content set), (2) exchanging container in terms of displaying locations, (3) combining containers, (4) moving a container along the time axis, (5) enlarging or reducing of a time scale for a container, and (6) automatically updating a container, in a similar manner as described above with reference to FIGS. 5 to 10.

The present invention is applicable to a wide variety of electronic devices having a capability of acquiring content sets, a conversion capability, a capability of producing display data, and a capability of displaying data, such as a personal computer of a desktop type for use in home, a mobile computer such as a notebook-type personal computer capable of being carried by a user, a personal information device having a communication capability such as a PDA (Personal Digital Assistants) device, a portable telephone device, etc.

It should be understood by those skilled in the art that various modifications, combinations, sub-combinations and alterations may occur depending on design requirements and other factors insofar as they are within the scope of the appended claims or the equivalents thereof.

What is claimed is:
1. A content viewing method comprising:
acquiring a content set;
converting a plurality of contents in the content set into a predetermined format;
arranging first indication information of at least some of the plurality of contents such that the first indication information is displayed on a display device in a first display area, arranged along a time axis according to date/time information associated with the at least some of the plurality of contents, the arranging enabling use of the at least some of the plurality of contents via the corresponding first indication information, and selection of one of the plurality of contents for use by selecting corresponding indication information from among the first indication information arranged along the time axis in the first display area; and
in response to one of the plurality of contents being selected for use via selection of first indication information corresponding to the one of the plurality of contents, arranging second indication information of one or more contents nearby the one of the plurality of contents such that the first indication information corresponding to the one of the plurality of contents and the second indication information of the one or more nearby contents is displayed on the display device in a second display area not associated with a time axis, the one or more nearby contents being close in time to the one of the plurality of contents selected for use in the first display area, the second indication information being arranged in the second display area in order of time;
wherein:
in the act of arranging, if the first indication information of at least some of the plurality of contents of the content set is already displayed in the first display area, new indication information of contents of a new content set specified to be displayed is arranged in a line parallel to a line in which the first indication information lies, without changing the time axis, and
the content viewing method comprises controlling displaying of the first indication information, in accordance with an operation command input by a user, so that the new indication information is displayed in the first display area parallel to the first indication information.

2. The content viewing method according to claim 1, wherein the act of controlling displaying includes scrolling the first indication information in a direction along the time axis or enlarging or reducing the first indication information along the time axis in accordance with an operation command input by a user.

3. The content viewing method according to claim 1, wherein the act of controlling displaying includes one or more sub-acts from a group consisting of: deleting a content set, exchanging content sets, combining content sets, moving a content set in terms of time, expanding a content set in terms of time, reducing a content set in terms of time, and automatically updating a content set.

4. The content viewing method according to claim 1, wherein the first indication information corresponding to each of the at least some of the plurality of contents is individually selectable to use the corresponding content.

5. The content viewing method according to claim 1, wherein in the act of controlling displaying, the first indication information is displayed in an integrated fashion regardless of the types of the contents and regardless of the sources of the contents.

6. The content viewing method according to claim 1, wherein the first indication information corresponding to each content in the plurality of contents at least partially identifies the corresponding content.

7. The content viewing method according to claim 1, wherein making it possible to use the at least some of the plurality of contents via the corresponding first indication information comprises, upon selection of the corresponding first indication information, presenting the corresponding content.

8. The content viewing method according to claim 1, further comprising:
controlling a display of the first indication information of the plurality of contents as a whole, along the time axis, in a third display area.

9. The content viewing method according to claim 1, wherein the first indication information comprises a thumbnail image corresponding to each of the at least some of the plurality of contents.

10. The content viewing method according to claim 1, wherein the content set comprises a first subset stored locally and a second subset accessible via the Internet.

11. A content viewing apparatus comprising:
an acquisition unit adapted to acquire a content set;
at least one processor programmed to implement:
a conversion unit adapted to convert a plurality of contents in the content set into a predetermined format;
an arrangement unit adapted to:
arrange first indication information of at least some of the plurality of contents such that the first indication information is displayed on a display device in a first display area, arranged along a time axis according to date/time information associated with the at least some of the plurality of contents, the arranging enabling use of the at least some of the plurality of contents via the corresponding first indication information, and selection of one of the plurality of contents for use by selecting corresponding indication information from among the first indication information arranged along the time axis in the first display area, and
in response to one of the plurality of contents being selected for use via selection of first indication information corresponding to the one of the plurality of contents, arrange second indication information of one or more contents nearby the one of the plurality of contents such that the first indication information corresponding to the one of the plurality of contents and the second indication information of the one or more nearby contents is displayed on the display device in a second display area not associated with a time axis, the one or more nearby contents being close in time to the one of the plurality of contents selected for use in the first display area, the second indication information being arranged in the second display area in order of time;

wherein:
the arrangement unit is adapted to arrange indication information such that if the first indication information of at least some of the plurality of contents of the content set is already displayed in the first display area, new indication information of contents of a new content set specified to be displayed is arranged in a line parallel to a line in which the first indication information lies, without changing the time axis, and
the content viewing apparatus comprises a display control unit adapted to control display of the first indication information, in accordance with an operation command input by a user, so that the new indication information is displayed in the first display area parallel to the first indication information.

12. The content viewing apparatus of claim 11, wherein the arrangement unit is further adapted to arrange location information of the plurality of contents such that the location information is displayed on the display device in a third display area, arranged along a second time axis according to date/time information associated with the plurality of contents.

13. The content viewing apparatus of claim 11, wherein the display control unit is further adapted to move indication information of the plurality of contents along the time axis as a whole, thereby shifting the date/time information associated with the plurality of contents by a same amount, in accordance with an operation command input by the user.

14. The content viewing apparatus of claim 11, wherein the display control unit is further adapted to alter a time scale of indication information of the plurality of contents as a whole, thereby multiplying time intervals among the indication information by a constant factor, in accordance with an operation command input by the user.

15. A content viewing apparatus comprising:
acquisition means for acquiring a content set;
conversion means for converting a plurality of contents in the content set into a predetermined format;
arrangement means for:
arranging first indication information of at least some of the plurality of contents such that the first indication information is displayed on a display device in a first display area, arranged along a time axis according to date/time information associated with the at least some of the plurality of contents, the arranging enabling use of the at least some of the plurality of contents via the corresponding first indication information, and selection of one of the plurality of contents for use by selecting corresponding indication information from among the first indication information arranged along the time axis in the first display area, and
in response to one of the plurality of contents being selected for use via selection of first indication information corresponding to the one of the plurality of contents, arranging second indication information of one or more contents nearby the one of the plurality of contents such that the first indication information corresponding to the one of the plurality of contents and the second indication information of the one or more nearby contents is displayed on the display device in a second display area not associated with a time axis, the one or more nearby contents being close in time to the one of the plurality of contents selected for use in the first display area, the second indication information being arranged in the second display area in order of time, wherein:
the arrangement means is adapted to arrange indication information such that if the first indication information of at least some of the plurality of contents of the content set is already displayed in the first display area, new indication information of contents of a new content set specified to be displayed is arranged in a line parallel to a line in which the first indication information lies, without changing the time axis, and
the content viewing apparatus comprises a display control means adapted to control display of the first indication information, in accordance with an operation command input by a user, so that the new indication information is displayed in the first display area parallel to the first indication information.

16. The content viewing apparatus according to claim 15, wherein the display control means is adapted to scroll the first indication information in a direction along the time axis or enlarge or reduce the first indication information along the time axis in accordance with an operation command input by a user.

17. The content viewing apparatus according to claim 15, wherein the display control means is adapted to perform, as required, one or more processes from a group consisting of: deleting a content set, exchanging content sets, combining content sets, moving a content set in terms of time, expanding a content set in terms of time, reducing a content set in terms of time, and automatically updating a content set.

18. A storage device having stored thereon a content viewing program, the program being executable by a computer of a content viewing apparatus including acquisition means for acquiring one or more contents, conversion means for converting the acquired contents as required, arrangement means for arranging indication information of the contents and displaying the indication information at arranged locations, and display control means for controlling displaying of the indication information displayed on the display device, the program including the acts of:
acquiring, via the acquisition means, a content set;
converting, via the conversion means, a plurality of contents in the content set into a predetermined format;
arranging, by the arrangement means, first indication information of at least some of the plurality of contents such that the first indication information is displayed on a display device in a first display area, arranged along a time axis according to date/time information associated with the at least some of the plurality of contents, the arranging enabling use of the at least some of the plurality of contents via the corresponding indication information, and selection of one of the plurality of contents for use by selecting corresponding indication information from among the first indication information arranged along the time axis in the first display area; and
in response to one of the plurality of contents being selected for use via selection of first indication information corresponding to the one of the plurality of contents, arranging, by the arrangement means, second indication information of one or more contents nearby the one of the plurality of contents such that the first indication information corresponding to the one of the plurality of contents and the second indication information of the one or more nearby contents is displayed on the display device in a second display area not associated with a time axis, the one or more nearby contents being close in time to the one of the plurality of contents selected for use in the first display area, the second indication information being arranged in the second display area in order of time;

wherein:

in the act of arranging, if the first indication information of at least some of the plurality of contents of the content set is already displayed in the first display area, new indication information of contents of a new content set specified to be displayed is arranged in a line parallel to a line in which the first indication information lies, without changing the time axis, and the program comprises an act of controlling display of the first indication information, in accordance with an operation command being input by a user, so that the new indication information is displayed in the first display area parallel to the first indication information.

19. The storage device according to claim 18, wherein the act of controlling displaying includes scrolling the first indication information in a direction along the time axis or enlarging or reducing the first indication information along the time axis in accordance with an operation command input by a user.

20. The storage device according to claim 18, wherein the act of controlling displaying includes one or more sub-acts from a group consisting of: deleting a content set, exchanging content sets, combining content sets, moving a content set in terms of time, expanding a content set in terms of time, reducing a content set in terms of time, and automatically updating a content set.

* * * * *